United States Patent
Varaksin et al.

(10) Patent No.: US 9,708,828 B2
(45) Date of Patent: Jul. 18, 2017

(54) METHODS AND SYSTEMS FOR PROTECTION FROM DESTRUCTIVE DYNAMIC VORTEX ATMOSPHERIC STRUCTURES

(76) Inventors: Alexey Varaksin, Moscow (RU);
Arkady Rozenshteyn, Beachwood, OH (US); Mikhail Romash, Moscow (RU); V. Kopeitsev, Moscow (RU)

(*) Notice: Subject to any disclaimer, the term of this patent is extended or adjusted under 35 U.S.C. 154(b) by 1555 days.

(21) Appl. No.: 13/101,388

(22) Filed: May 5, 2011

(65) Prior Publication Data

US 2011/0272032 A1 Nov. 10, 2011

Related U.S. Application Data

(60) Provisional application No. 61/331,886, filed on May 6, 2010.

(51) Int. Cl.
*E04H 9/14* (2006.01)

(52) U.S. Cl.
CPC .......... *E04H 9/14* (2013.01); *Y10T 137/0318* (2015.04)

(58) Field of Classification Search
CPC .............................. E04H 9/14; Y10T 137/0318
USPC ................ 52/84, 173.1, 29; 239/2.1
See application file for complete search history.

(56) References Cited

U.S. PATENT DOCUMENTS

| | | | | |
|---|---|---|---|---|
| 2,270,537 A * | 1/1942 | Ludington | .................... | 52/173.1 |
| 2,270,538 A * | 1/1942 | Ludington | ........................ | 52/15 |
| 3,866,363 A * | 2/1975 | King | .................................. | 52/29 |
| 4,094,108 A * | 6/1978 | Scott | .................................... | 52/1 |
| 4,144,802 A * | 3/1979 | Babin | ........................... | 454/353 |
| 4,461,129 A * | 7/1984 | von Platen | .................. | 52/173.1 |
| 5,058,837 A * | 10/1991 | Wheeler | .................... | 244/200.1 |
| 5,918,430 A * | 7/1999 | Rowland | ........................ | 52/202 |
| 6,393,776 B1 * | 5/2002 | Waller et al. | ................ | 52/169.6 |
| 6,532,702 B1 * | 3/2003 | Scribner | ......................... | 52/202 |
| 6,550,189 B2 * | 4/2003 | Shelton | ........................ | 52/167.1 |
| 6,601,348 B2 * | 8/2003 | Banks et al. | ...................... | 52/25 |
| 7,276,809 B2 * | 10/2007 | Zambrano et al. | ............ | 290/55 |
| 7,487,618 B2 * | 2/2009 | Lin | .................................... | 52/84 |
| 7,587,867 B2 * | 9/2009 | Weber | ............................ | 52/202 |
| 7,823,335 B2 * | 11/2010 | Lin | .................................... | 52/58 |
| 7,827,739 B2 * | 11/2010 | Graf | .................................. | 52/84 |
| 7,827,740 B2 * | 11/2010 | Lin | .................................... | 52/84 |
| 7,836,642 B2 * | 11/2010 | Lin | .................................... | 52/97 |
| 2004/0200181 A1* | 10/2004 | Martinez-Cepeda | ........ | 52/741.1 |
| 2004/0226301 A1* | 11/2004 | DuBrucq | ........................ | 62/50.1 |
| 2005/0039626 A1* | 2/2005 | Yi et al. | ......................... | 102/363 |
| 2007/0022672 A1* | 2/2007 | Bachynski | .................... | 52/90.1 |
| 2008/0016790 A1* | 1/2008 | Weber | ............................ | 52/90.1 |
| 2008/0083171 A1* | 4/2008 | Graf | .................................. | 52/57 |
| 2010/0072297 A1* | 3/2010 | Savla et al. | .................. | 239/14.1 |

(Continued)

*Primary Examiner* — James Ference
(74) *Attorney, Agent, or Firm* — Mark E. Bandy; Rankin, Hill & Clark LLP

(57) ABSTRACT

Various methods and systems for protecting humans as well as individual objects from tornadoes and other naturally occurring dynamic atmospheric vortex structures are described. Active protective systems interact with such vortex structures leading to destabilization and destruction of the vortex structures. The energy required for the destabilization and destruction of the vortex structure is taken from the energy from the vortex structure itself. The method requires no external energy sources for destabilization and destruction of vortex structures such as tornadoes.

13 Claims, 19 Drawing Sheets

(56) References Cited

U.S. PATENT DOCUMENTS

2010/0082253 A1\* 4/2010 Buchanan .................. 702/3
2012/0175427 A1\* 7/2012 Feldman et al. ............. 239/2.1

\* cited by examiner

METHODS AND SYSTEMS FOR PROTECTION FROM DESTRUCTIVE DYNAMIC VORTEX ATMOSPHERIC STRUCTURES

CROSS REFERENCES TO RELATED APPLICATIONS

This application claims priority from U.S. provisional application Ser. No. 61/331,866 filed on May 6, 2010.

FIELD OF THE INVENTION

The present invention relates to methods and systems for protecting areas or regions from destructive dynamic vortex atmospheric structures (DVAS) such as tornadoes, cyclones, and the like.

BACKGROUND OF THE INVENTION

Previously known efforts in the field of protection, destruction, or prevention of atmospheric vortex structures or similar atmospheric phenomena can be classified in the following categories—methods for passive protection of structures and people; methods for influencing or ultimately destroying a vortex structure by use of external energy sources; methods of destruction using chemical reactions; and preventative methods, such as thwarting the formation of vortex structures.

Regarding methods for passive protection of structures and people, most methods are based on the use of special protective structures for preserving other structures and preventing harm to people. Examples of such structures include bunkers, boards, fastening elements for houses, and protective walls with enhanced durability characteristics, etc. The following patent references are representative of this category.

U.S. Pat. No. 4,094,108 to Harley D. Scott (1978) includes designs of protective panels for walls of houses.

U.S. Pat. No. 4,144,802 to Paul A. Babin (1979) includes various protective designs for houses and constructions.

U.S. Pat. No. 5,918,430 to Clark D. Rowland (1999) describes specially built removable boards for strengthening doors and windows of houses.

U.S. Pat. No. 6,393,776 to James E. Waller and Ian E. McElwain (2002), describes composite structures with cement pipes for construction of strengthened houses.

U.S. Pat. No. 6,532,702 to Paul J. Scribner (2003) is directed to various devices for protection of elements and blocks of constructions that can be assembled and disassembled as necessary.

U.S. Pat. No. 6,550,189 to Andrew B. Shelton (2003) relates to a specialized shelter for individuals in the form of a streamlined tent fastened to the ground, in which people may take refuge.

US Patent Publication 2004/0200181 to Federico Martinez-Cepeda (2004) is directed to construction elements for building houses, allowing the maintenance of dynamic loads.

US Patent Publication 2007/0022672 to Michel Raymond Bachynsky (2007) describes external protective strengthening of structures in the form of shields capable of protecting constructions from hurricanes and whirlwinds.

The category of methods for influencing or ultimately destroying an atmospheric vortex structure by employing external energy sources is represented by the following patent references.

US Patent Publication 2002/0088364 to Boris Feldman (2002) proposes the use of various energy sources for the destruction of a tornado. Examples of such energy sources include solar energy, artificially induced currents, and the energy of an explosion.

US Patent Publication 2005/0039626 to Henry Yi and Jane Ju Yi (2005) proposes destroying a tornado by lessening the energy of a tornado as a result of creating an interaction with the system via an artificially created vortex located between the tornado and the protected object.

US Patent Publication 2003/085296 to Waxmanski (2003) proposes influencing a tornado by creation of sound waves of a certain frequency by specialized generators. In this regard, it is noted that sound waves can promote the formation of rain that can interfere with the development of spontaneous phenomena.

Patent RU 2062560 (1996) describes a method of destruction of a tornado by using an explosive charge which is exploded at a set height in the path of the tornado. The explosive charge is placed in the zone of suction of the tornado.

In patent RU 2228020 (2004), a system is described for the destruction of typhoons and tornadoes by use of an explosive thermonuclear device. The system is carried aboard a missile carrier for delivery of the explosive component into an atmospheric stream of a typhoon or a tornado. Radar is used for detection and tracking. The explosive is a cassette-type bomb, with shells that include a detonator, an explosive in the form of a mix of deuterium with tritium or helium-3, and a converter from a fibrous composite. The detonator is composed of a target made from four cones containing an explosive that may be initiated by laser radiation. The converter employs transformation of kinetic energy of a stream of neutrons and protons, formed as a result of thermonuclear reaction, to acoustic emissions of shock waves influencing the environment.

Regarding the category of methods that propose a chemical reaction for destruction of an atmospheric vortex structure, the following patent references are representative.

US Patent Publication 2004/0226301 to Denyse DuBrucq (2004) describes a device for delivery and injection of liquid nitrogen into a cloud projecting a tornado, in order to destroy the tornado.

US Patent Publication 2007/0114298 to Dennis Robert O' Keefe (2007) proposes the use of various chemical coolers for the destruction of a tornado.

Patent RU 2027344 (1995) proposes a method of destruction of a tornado by delivering a heavy, chemically inert substance into a tornado vortex zone of maximum angular velocity, thereby influencing the character of the vortex current.

Preventative methods directed at creating conditions that prevent the formation of tornadoes and hurricanes are exemplified in the following patent references.

US Patent Publication 2007/0101921 to Steven H. Goldshmidt (2007) proposes the prevention of hurricanes by cooling the surface of ocean water in the path of a forming hurricane.

Chinese Patent Application 1695431A to Liao Y (2005) proposes the creation of one or more artificial rain areas or columns that would interfere with the formation of a tornado.

Korean Patent Application 20010027701 A to Young Y. S. (2001) proposes the formation of a forest belt that would potentially prevent rapid changes of density, humidity and air temperatures.

US Patent Publication 2005/0039626 to Yi H. Yi J. J. (2005) proposes a system for creating air streams near the earth, forming artificial tornadoes. The purpose of creating artificial tornadoes is to prevent formation, or stop, a natural tornado.

Each of the previously noted methods contains a number of undesirable aspects, thereby complicating or making impossible their practical realization under natural circumstances, for either technical reasons, economic reasons, or both. Furthermore, there is no reason to pursue these approaches since it is believed that none have ever been realized in practice.

Accordingly up to the present time, realistic and effective protection against a tornado and other destructive dynamic vortex atmospheric formations remains unresolved.

SUMMARY OF THE INVENTION

The difficulties and drawbacks associated with previously known approaches are addressed in the present method and system for destabilizing a dynamic atmospheric vortex structure.

In one aspect, the present invention provides a method for destabilizing a dynamic atmospheric vortex structure. The method comprises providing a cluster of spatially oriented discrete mechanical elements at a location relative to the vortex structure to thereby produce an area of local active anisotropy. This creates a non-stationary, turbulent field with significant anisotropy that destabilizes the vortex structure.

In another aspect, the present invention provides a method for protecting an object from a dynamic atmospheric vortex structure. The method comprises positioning a cluster of protective structures at a location relative to the vortex structure to produce an area of local active anisotropy. This creates a non-stationary, turbulent field with significant anisotropy that destabilizes the vortex structure and thereby protects the object.

In yet another aspect, the present invention provides a cluster of spatially oriented discrete mechanical elements adapted to produce an area of local active anisotropy upon sufficiently close proximity to a dynamic atmospheric vortex structure.

In still another aspect, the present invention provides a selectively positionably protective structure for protecting an object from a dynamic atmospheric vortex structure. The selectively positionable protective structure comprises a collection of modules in which each module includes a set of elementary turbulent transformers. The collection of modules are configured to exhibit a G parameter value of from about 0.0001 to about 10 m. The plurality of modules is positionable between (i) a non-use mode in which the plurality of modules lays flat or is retracted in ground so that the plurality of modules are substantially hidden from view, and (ii) a use mode in which the plurality of modules extends vertically upward.

As will be realized, the invention is capable of other and different embodiments and its several details are capable of modifications in various respects, all without departing from the invention. Accordingly, the drawings and description are to be regarded as illustrative and not restrictive.

BRIEF DESCRIPTION OF THE DRAWINGS

The invention is herein described, by way of example only, with reference to various embodiments of the present invention illustrated in the accompanying drawings, in which.

DETAILED DESCRIPTION OF THE PREFERRED EMBODIMENTS

The present invention is directed to meteorology, and more specifically to methods of destabilization and destruction of a tornado and other dynamic vortex atmospheric structures (DVAS), which represent a threat to localized population centers.

As a rule, DVAS are formed and stabilized in isotropic conditions near the earth's surface along a smooth plane. For all DVAS that exist for a significant length of time, the two previously mentioned conditions (isotropic conditions and smooth plane) are necessary factors for their occurrence and their subsequent continuation. It is known that all DVAS continuously change their parameters over the course of their existence and constantly preserve their vortex structure.

Despite various theories and hypotheses, the nature of the physical model and underpinnings of the DVAS and its stability have, until now, no adequate scientific explanation. However, from numerous physical observations and modeling experiments, several factors have been identified as being associated with the destabilization and destruction of DVAS. These factors include friction of air near a terrestrial plane, DVAS encountering a ground heterogeneity (constructions, woods, and etc.), and the interaction with other atmospheric streams and pressure differences. A primary factor, and one which is most apparent, which promotes a typical natural destruction of a DVAS, is disruption of physical conditions necessary for stabilization of the vortex structure which occur as a result of interaction with external factors.

Figure 1:
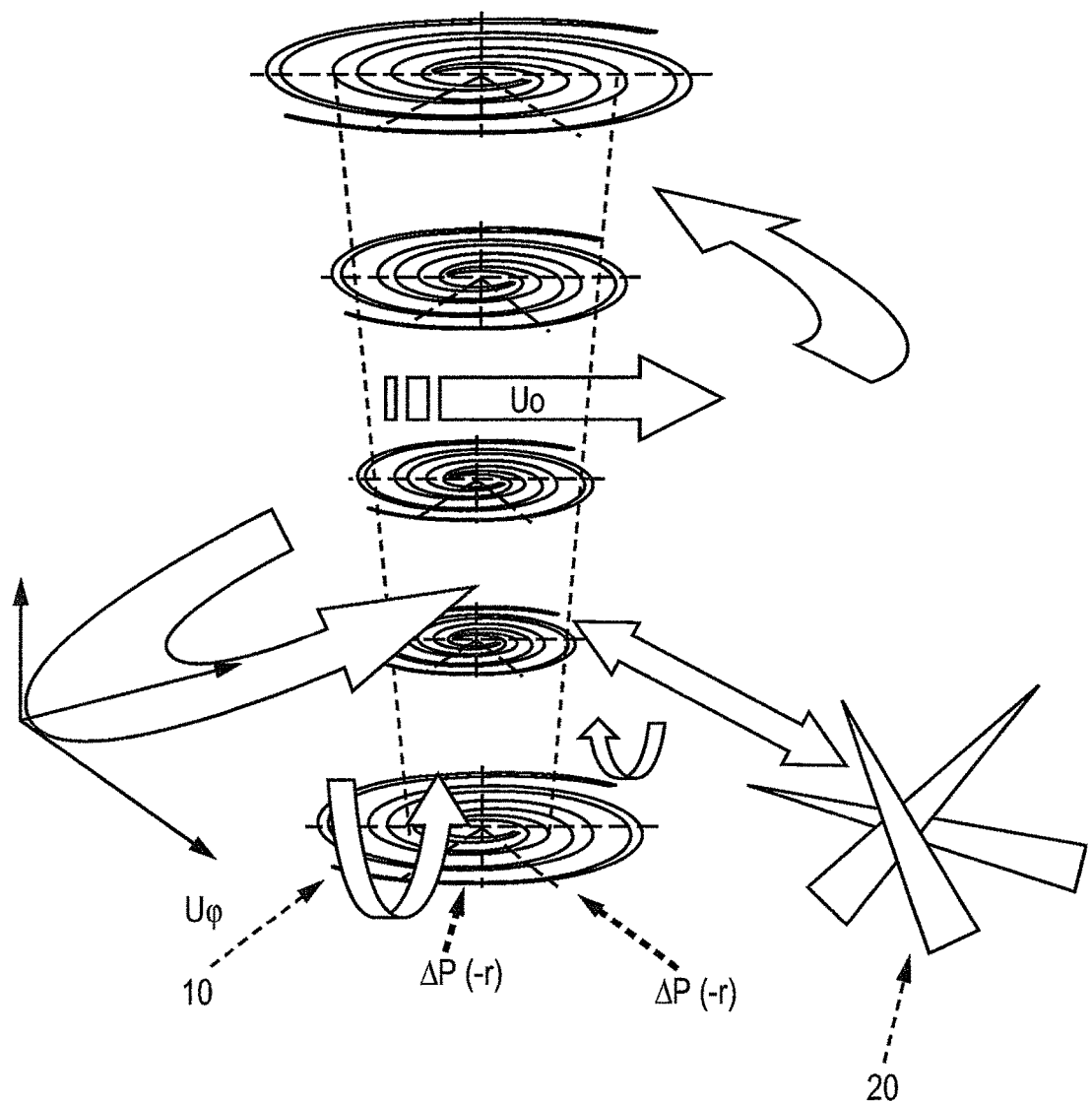
FIG. 1 is a schematic illustration of a dynamic vortex atmospheric structure with mean velocity vectors and corresponding directions shown.

The stable existence of a rotating dynamic vortex atmospheric structure, such as a tornado as depicted in FIG. 1, as well as any quasi-stationary rotating structure of other sort or type is based on the fundamental laws of nature for rotating objects, outlined as follows. The law of conservation of the kinetic moment or the moment of an impulse is set forth in equation (I).

$$m\omega R^2 = m U\phi R = \text{Const.} \qquad (I)$$

In equation (I), m is mass of a rotating structure, $\omega$ is angular velocity of rotation, $U\phi$ is tangential velocity, and R is the radius of the rotating structure corresponding to the tangential velocity $U\phi$ max. This law applies to all parts of the rotating structure and for all objects as a whole.

The law of conservation of the kinetic moment is only applicable if, and only if, the sum of the moments of the external forces acting on a rotating structure, are equal to zero. The applicability of this law for DVAS, (as well as for any freely rotating homogeneous or non-uniform structure), is predicated on the conservation of constant symmetry and isotropy of the surrounding space. For this reason, atmospheric vortex structures always arise and are only stable on smooth surfaces in conditions of symmetry and isotropy.

Any violation of symmetry and isotropy of the surrounding space results in the asymmetry of external forces acting on the rotating vortex atmospheric structure. This results in a violation of the principle of mass/matter conservation (also known as the law of conservation of mass), because typically an aerodynamic stream of air is absorbed by a vortex structure from the surrounding space (funnel effect), thus further promoting destabilization and the destruction of the turbulent structure.

The underlying basis of the present invention involves a method of artificial destabilization and subsequent destruction of a DVAS. The method is based on creating and positioning one or more areas of Local Active Anistropy (LAA) between the approaching DVAS and the object to be protected. Preferably, the LAA is in the form of a stationary or mobile structure. Due to the interaction between the LAA and the DVAS, a non-stationary aerodynamic turbulent field is created with significant anisotropy of physical parameters such as density, pressure, velocities of secondary flows, and parameters of turbulence.

The energy of the secondary turbulent field created by the LAA, is transferred from the energy of the DVAS, and nonlinearly increases with the spatial position of the LAA relative to the DVAS. The effective energy of the secondary field generated by the LAA also increases non-linearly.

The formation of a secondary field of turbulence and interaction of physically interrelated fields, for example interaction between the turbulent field of the DVAS and the non-stationary secondary field of turbulence generated by the LAA, is the primary factor contributing to local violation of symmetry and isotropy of the surrounding space around the DVAS. Nonlinearly increasing asymmetric influence of a secondary field on the vortex structure of the DVAS leads to a local violation of the law of conservation of mass and a violation of the law of zero-sum conservation of moments of the external forces of the DVAS. This in turn leads to the subsequent destabilization and ideally the ultimate destruction of the dynamic vortex atmospheric structure.

Based upon these discoveries, the present invention provides methods of local protection of regions having existing structures such as buildings from destructive dynamic vortex atmospheric structures. The methods involve disrupting or destabilizing a DVAS by means of turbulent fields generated by the secondary flows, created by the interaction of the DVAS with an area of artificial local active anisotropy (LAA). The LAA is preferably located between the DVAS and the object or region to be protected, and is preferably in the form of an ensemble or cluster of spatially oriented discrete mechanical elements, periodically referred to herein as elementary turbulent transformers (ETT), which carry out the transformation of energy time-averaged movements of the DVAS to energy of small-scale turbulent pulses.

The term "mechanical elements" refers to physical articles which are not naturally occurring, and so are man-made. These articles are configured, e.g., sized and shaped, to induce turbulence in air steams flowing past the article. As explained in greater detail herein, typically the mechanical elements are arranged in single structured groups of large numbers, such as from about 200 (for a 1-D elementary cluster made from the plane square a×a in which the first cut out portion has the sizes a1×a1 where a1=a−2δeff and δeff/a is about 0.01), to about 4 (the frame a×a only with diameter δeff), and preferably for a 1-D elementary cluster from about 20 to about 12. Each mechanical element is preferably oriented in the same manner as other mechanical elements in the collection. In certain embodiments described herein, the mechanical elements all utilize the same or similar shape, such as for example, cylindrical.

Thus, in accordance with the present invention, methods are provided for protecting one or more regions and/or objects such as buildings within the regions, from DVAS. The methods utilize a collection of one or more ETTs which are positioned between the DVAS and the regions or buildings to be protected. Preferably, the ETTs are arranged in certain configurations referred to herein as protective structures. Upon sufficient proximity between the DVAS and the collection of ETTs, an area of local active anisotropy (LAA) is created. As previously explained, secondary turbulent air flows are created by the ETTs. The formation of the secondary flows draw energy from the approaching DVAS. And, the secondary flows influence and destabilize the DVAS. Ideally, the secondary flows ultimately result in the destruction of the DVAS.

Figure 2:
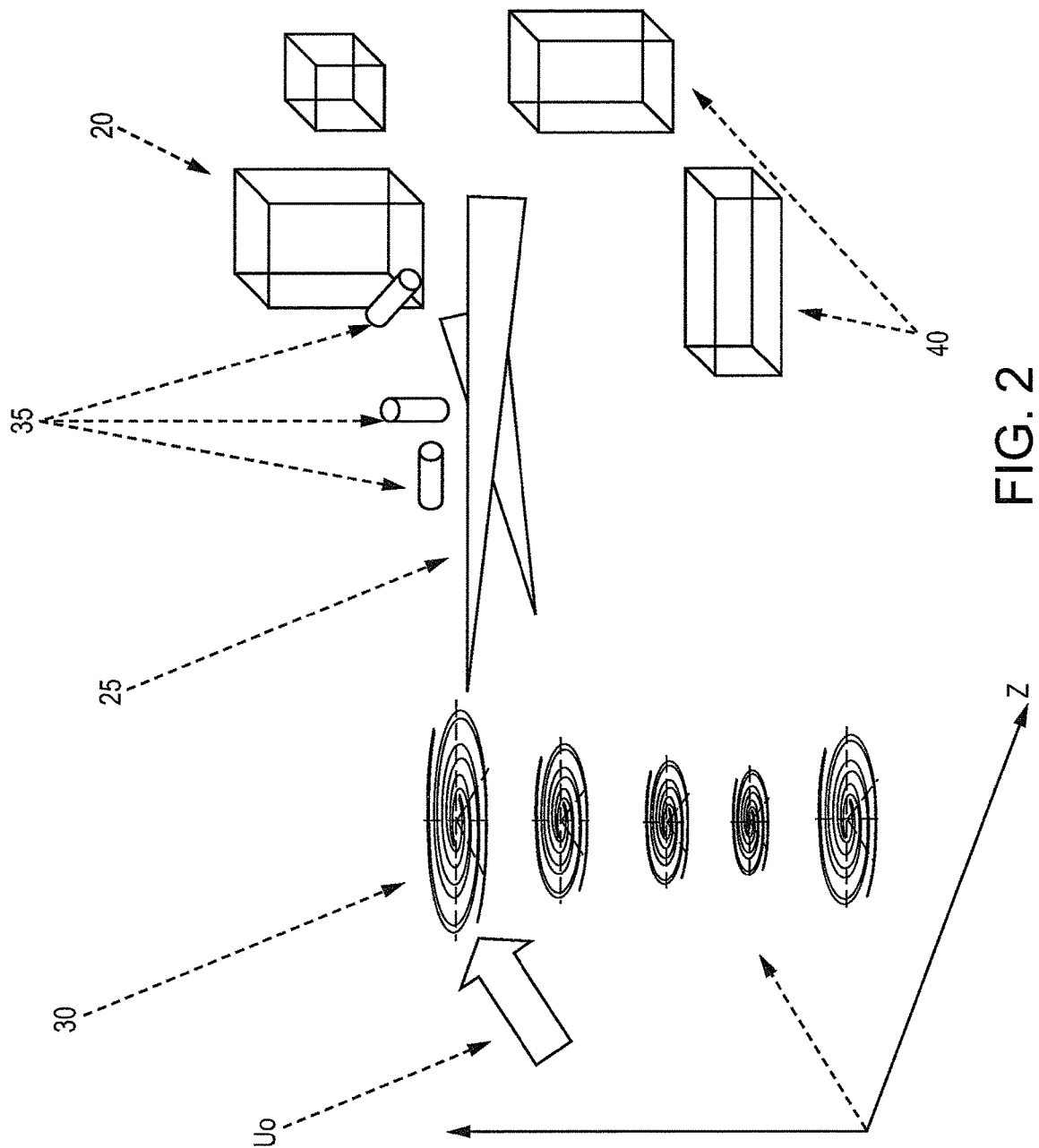
FIG. 2 schematically illustrates a preferred positional relationship of a protected region, a protective structure and a dynamic vortex atmospheric structure.
Figure 3:
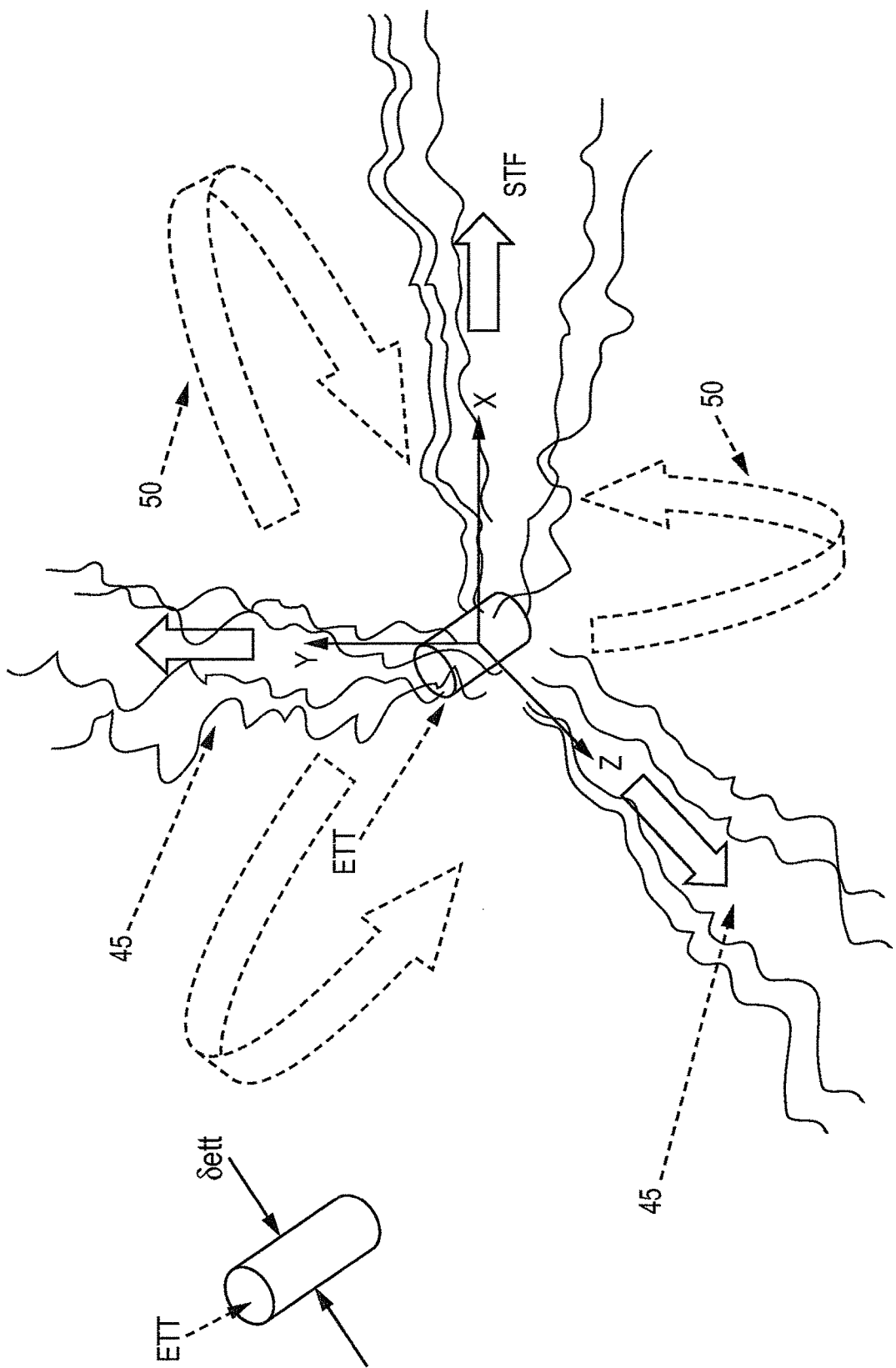
FIG. 3 schematically illustrates the directions of secondary flows generated by a single preferred embodiment elementary turbulent transformer (EU) with arbitrary space orientation.
Figure 4:
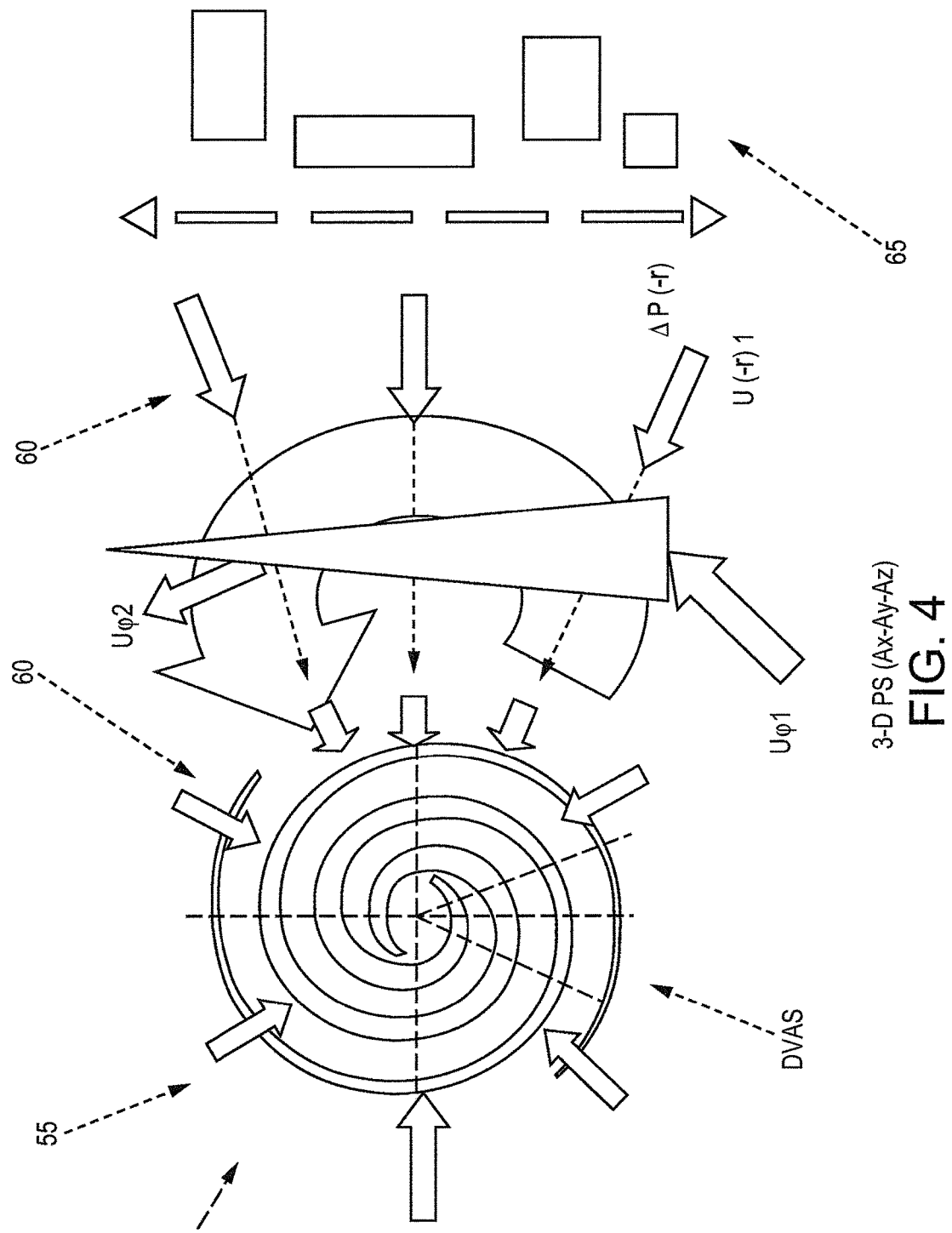
FIG. 4 schematically shows a preferred positional relationship of a protected region, a protective structure and a dynamic vortex atmospheric structure with the mean streams with velocity vectors U$\phi$, Ur before and after the protective structure.
Figure 13A:
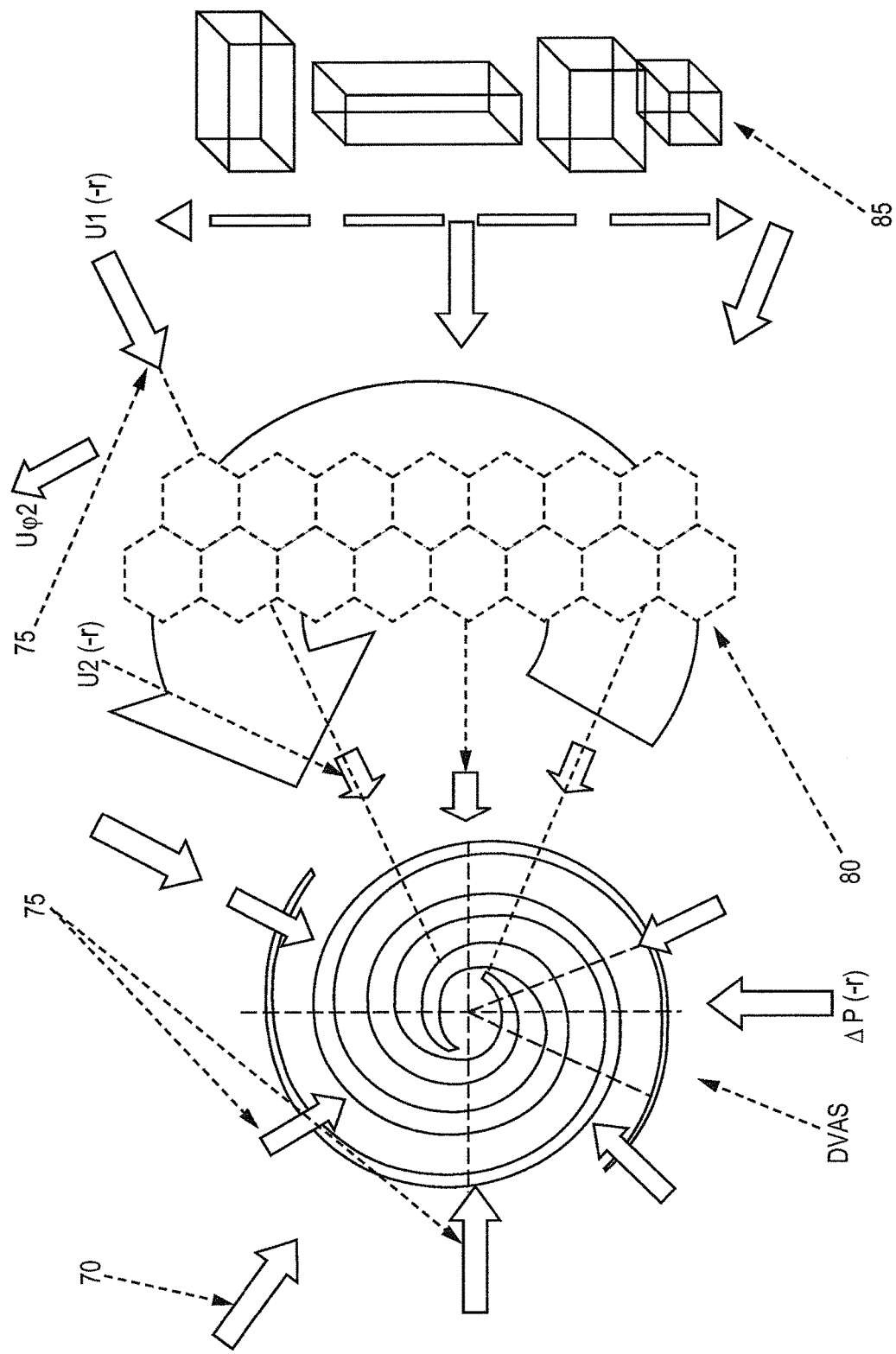
FIG. 13 schematically illustrates a preferred embodiment 3-D "honeycomb" protective system (a), a preferred embodiment 3-D "saw" protective system (b), and a preferred embodiment 3-D "plane grids" protective system.
Figure 13B:
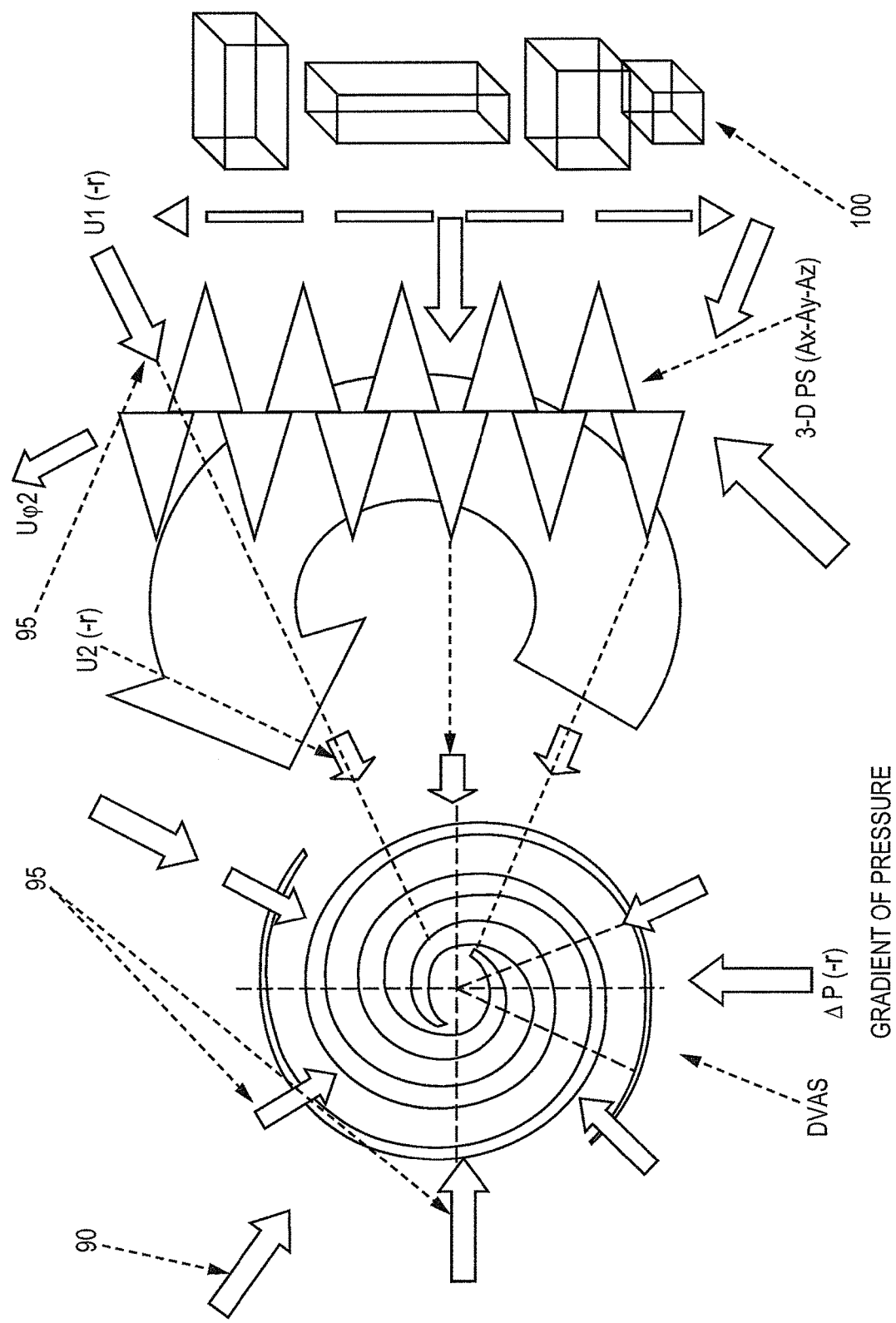
Figure 13C:
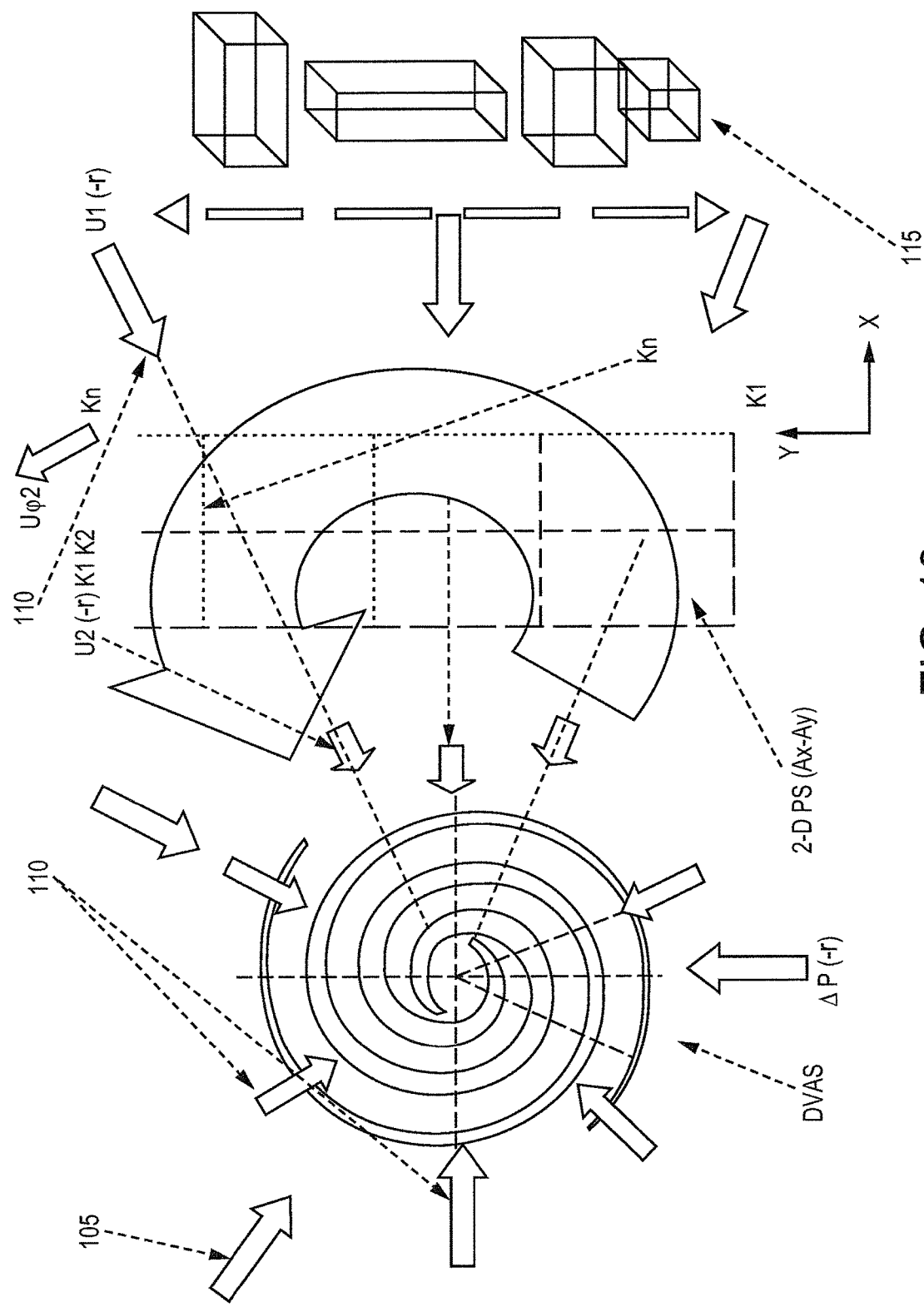

In FIG. 1, 10 refers to radial flows generated by radial pressure gradient $\Delta P(-r)$; and 15 refers to local active anisotropy area (LAA). In FIG. 2, 20 refers to protected region PR (Area 1); 25 refers to 3-D protective structure 3-D PS (Area 2); 30 refers to dynamic vortex atmospheric structure DVAS (Area 3); 35 refers to elementary turbulent transformers ETT; and 40 refers to unprotected region. In FIG. 3, 45 refers to STF-secondary turbulent flow; and 50 refers to local turbulent flows of DVAS. In FIG. 4, 55 refers to ΔP(−r) gradient of pressure; 60 refers to radial flows caused by ΔP(−r); and 65 refers to protected region. In FIG. 13a, 70 refers to ΔP(−r) gradient of pressure; 75 refers to radial flows caused by ΔP(−r); 80 refers to honeycomb pattern quasi-cluster protected structure; and 85 refers to protected region. In FIG. 13b, 90 refers to ΔP(−r) gradient of pressure; 95 refers to radial flows caused by ΔP(−r); and 100 refers to protected region. In FIG. 13c, 105 refers to ΔP(−r) gradient of pressure; 110 refers to radial flows caused by ΔP(−r); and 115 refers to protected region.

FIG. 1 is a schematic illustration of a dynamic vortex atmospheric structure depicting mean velocity vectors and their corresponding directions. FIG. 1 also illustrates an area of local active anisotropy (LAA). Extending around the periphery of the DVAS are radically directed air flows generated by a radial pressure gradient. The following designations are used herein. $U\phi$ is local tangential velocity, $U(r)$ is local radial velocity, Rm is radius of the DVAS corresponding to $U\phi$ max, U0 is average velocity of the vortex structure as a whole, and ΔP is gradient of pressure caused by the rotation of DVAS and determined by $U\phi$.

In one aspect, the present invention provides particular forms or configurations of ETTs. For example, in one embodiment, a collection of ETTs are provided in the form of a three dimensional protective structure, designated herein as a 3-D PS. The one or more 3-D PS structures are positioned or located between a DVAS and a region or object to be protected. As previously explained, the protective structure such as the 3-D PS and its location relative to the DVAS, creates an area of local active anisotropy (LAA). FIG. 2 schematically illustrates a 3-D PS and positioning of the protective structure between a DVAS and a protected region. More specifically, referring to FIG. 2, the present invention is realized under conditions of an asymmetric arrangement of a protective structure 3-D PS (area 2), in relation to a DVAS (area 3) in the space between a protected area or region PR (area 1) and the DVAS (area 3) moving with average velocity U0 in a direction toward the protected region. FIG. 2 also illustrates an unprotected region. This region is unprotected because a protective structure is not disposed between the DVAS and the region. Since a protective structure is not positioned or located between the region and the DVAS, a region of local active anistropy (LAA) is not formed.

An interaction occurs between each ETT of the protective structure 3-D PS positioned in the area of local active anisotropy (LAA), and the atmospheric streams or air flows from the DVAS. Specifically, at the interaction between each ETT located in the field of LAA, with atmospheric streams associated with the DVAS, the following phenomena occur:

(a) generation of secondary turbulent flows in the form of local turbulent traces with small-scale turbulence, the direction of which depends on a direction of a local vector of velocity of an atmospheric stream in the field of ETT localization (FIG. 2);

(b) surface friction of ETT and the reduction of the velocity of the flowing stream leading to dissipation of energy of the turbulence of the DVAS and occurrence of local zones of high pressure in the field of the traces after ETT;

(c) generation of acoustic oscillations (small waves of pressure), expanding with the speed of sound and permeating into the structure of the DVAS.

In the energy-consuming process of the formation of secondary turbulent flows, preferably every individual ETT plays a role as an aerodynamic "converter", transforming average energy movements of DVAS, into small-scale turbulence of local secondary flows with the formation of local areas of increased pressure in a trace after the ETT.

Thus, the physical and compositional aspects of ETTs do not influence the physics of the process. Instead, the interaction between an ETT and an atmospheric stream or air flow associated with the DVAS is defined by the geometry of an ETT only and its orientation in relation to the velocity of the stream. This is schematically depicted in FIG. 3. Referring to that figure, an elementary turbulent transformer (ETT) is depicted. Depending upon the characteristics of the ETT and its orientation to a DVAS, local turbulent flows of air from or associated with the DVAS are converted or transformed into secondary turbulent flows (STF). The secondary turbulent flows exhibit a greater degree of turbulence than the local turbulent flows from the DVAS.

The use of a sufficient quantity of ETTs, preferably organized in a three dimensional protective structure, leads to asymmetric influence of a multitude of non-stationary and non-uniform turbulent fields of secondary flows. These turbulent fields of secondary flows disrupt or at least interfere with the vortex structure stream with $U\phi$, Ur, and local vectors of velocity in the field of localization of the protective structure, as schematically shown in FIG. 4. FIG. 4 schematically illustrates a three dimensional protective structure 3-D PS which produces an area of local active anisotropy. The protective structure is positioned between a DVAS and a region to be protected, shown as a protected region. Upon sufficiently close proximity by the DVAS, air flows are induced toward the DVAS. As previously explained, these air flows are radial air flows and are caused by the pressure differences in the affected regions. As shown in FIG. 4, air from the protected region is drawn through the protective structure to the DVAS. Air flows passing through the protective structure are significantly increased in turbulence.

These asymmetric influences, nonlinearly increasing with approach of a DVAS to a protective structure, leads to a change in absolute values of local $U\phi$ and Ur components of the velocity vector, thereby defining the moment of impulse of the DVAS and velocity of air suction in the funnel of the DVAS. This causes a violation of compliance of the law of conservation of impulse and mass, which results in subsequent destabilization and destruction of most DVAS.

The interaction between the DVAS and the protective system is initially remote. The conditions of the remote interaction between DVAS and the protective system, are defined by equation (II). This equation relates the effective size of an ETT with the average value of the air velocity U. This equation and its basis is described in Varaksin A, "Turbulent Particle Laden Gas Flows," Springer-Verlag Berlin Heidelberg, 2007. In case of a vortex structure with the dominant flow defined by tangential velocity $U\phi$, the condition of the beginning of the generation of a turbulent trace by an ETT, with the characteristic size δeff (see FIG. 3), generally occurs as follows:

$$Re(\delta) = U\phi \delta eff/\gamma > 1000 \qquad (II)$$

When $\delta eff \geq 1000\gamma/U\phi$

In this equation, Re (δ) is the Reynolds's number associated with flow about the ETT with characteristic linear size δeff (m); $U\phi$ is the value of the tangential velocity (m/s); and γ is viscosity of air (m$^2$/s) which is approximately 15·10 (−6) (m$^2$/s).

Figure 5:
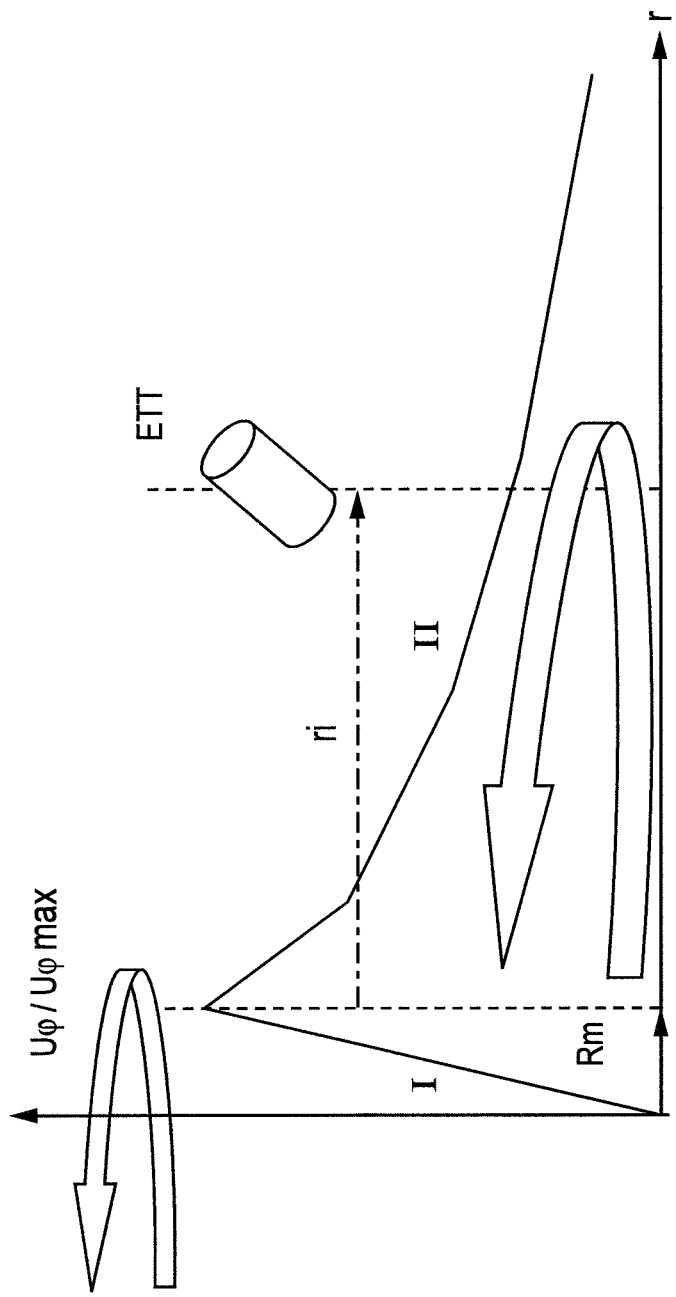
FIG. 5 illustrates the tangential U$\phi$ velocity distribution as a function of distance r from a dynamic vortex atmospheric structure.

As shown in Giarotti Dario B, Stel Fulvio, "The Rankin Vortex Model," University of Triest, 16/A I-33040 Visco UD, Italy, 2006, 14 p; the distribution of the tangential velocity $U\phi$ of a tornado as a function of distance is similar to FIG. 5. In FIG. 5, the vertical or y-axis represents the center of a DVAS. The x-axis represents linear radial distance from the center of the DVAS. The line plotted in FIG. 5 is the local tangential velocity. For distances in which r>Rm, where r is current coordinate, and Rm is the maximum radius of a DVAS such as a tornado, Uφ which is local tangential velocity can be described by equation (III):

$$U\varphi = U\varphi max(Rm/r) \quad \quad (III)$$

at r>Rm

From equations (II) and (III), formula (IV) is derived, thereby enabling the estimation of the minimal distance or r min of the beginning of interaction between a DVAS and a protective system. The distance at which interaction begins depends upon the scale of the DVAS. For a tornado, the tornado can be classified according to the Fujita scale which is described in Fujita, T., "Tornadoes and Downbursts in the Context of Generalized Planetary Scales," *J. Atmos. Sci* 38, 1981, 1511-1534. Specifically, formula (IV) provides estimation of r min from a protective system having a number of ETT with a characteristic size δeff:

$$r min < U\varphi max Rm \delta eff / 1000 \quad \quad (IV)$$

Estimated distances (in meters) for the beginning of interactions of a tornado of a various classes and different radiuses with individual ETTs (protective structures) are presented in Table 1. For convenience and simplicity of calculations, the characteristic size of the cylindrical ETT was assumed to be 10 mm, and the viscosity of air γ is 15·10 (−6) (m²/s).

TABLE 1

Distance of Initial Interaction Based on Tornado Scale

| Fujita Scale | F0 | F1 | F2 | F3 | F4 | F5 |
|---|---|---|---|---|---|---|
| Uφ (m/s) | 25 | 42 | 60 | 82 | 105 | 130 |
| r (m) (Rm = 10 m) | 175 | 294 | 420 | 574 | 735 | 910 |
| r (m) (Rm = 20 m) | 350 | 588 | 820 | 1,148 | 1,470 | 1,820 |
| r (m) (Rm = 50 m) | 875 | 1,470 | 2,100 | 2,870 | 3,675 | 4,550 |

The results from Table 1 indicate that even the weakest tornadoes, DVAS, or other vortex atmospheric formations start to interact with ETT at distances of hundreds of meters. Thus, disruption of DVAS using the methods and protective structures of the present invention begins at significant distances from objects or regions to be protected. Therefore, as described herein, the methods, systems, and structures typically begin to interact and disrupt a tornado (depending upon the size of the tornado), at distances of more than 100 m, preferably more than 500 m, more preferably more than 1,000 m, more preferably more than 1,500 m, more preferably more than 2,000 m, more preferably more than 3,000 m, and most preferably more than 4,000 m. These distances are referred to in the term "sufficiently close proximity."

As previously noted in a preferred embodiment, the present invention provides various protective structures (3-D PS). Preferably, these structures satisfy the following criteria:
(a) exhibit relatively low aerodynamic resistance and sufficient durability, thus allowing the structure to sustain relatively high mechanical loads, during time of interaction with a DVAS;
(b) exhibit relatively low aerodynamic transparency for all current streamlets of the dominant flows of a DVAS;
(c) include enough ETT necessary and sufficient for achievement of a destructive influence on a DVAS;
(d) provide interaction of every ETT with streams of any direction in the DVAS.

To achieve a maximum effect of interaction between dominating streams of a DVAS and a protective structure, the protective structure preferably includes three orthogonally oriented structures or surfaces Ax, Ay, Az interacting with accordingly oriented streams of the dynamic vortex atmospheric structure. The dominating streams of a DVAS can be characterized by tangential velocity Uφ, radial velocity U(r), vertical velocity Uy, and average velocity of DVAS movement Uo.

Each structure Ax, Ay, Az is preferably provided by numerous individual ETT. The components of a protective structure can be organized or classified in a hierarchy as follows:
(1) Elementary Turbulent Transformer, ETT
(2) Two-Dimensional Plane Layer, 2-D PL
(3) Two-Dimensional Periodic Structure, 2-D PS
(4) Three-Dimensional Elementary Cluster, 3-D EC
(5) Three-Dimensional Protective Cluster Structure, 3-D PS Each level of hierarchy carries out the following functions:
(a) ETT (the individual converter of turbulence)—has the function of local transformation of a turbulent field of an approaching stream in the area of ETT localization;
(b) 2-D PL (an individual two-dimensional layer)—has the function of local transformation of an elementary area of DVAS stream in the place of layer localization, under a condition of minimally possible integrated layer aerodynamic resistance;
(c) 2-D PS (periodic two-dimensional structure)—has the function of transformation of a defined area of the DVAS turbulent field under a condition of minimally possible integrated aerodynamic resistance of 2-D PS;
(d) 3-D EC (individual spatial cluster)—has the function of the maximally possible transformation of an elementary volume of DVAS turbulent field under a condition of minimally possible integrated aerodynamic resistance of 3-D EC;
(e) 3-D PS (spatial cluster structure)—has the function of the greatest possible transformation of defined volume of DVAS turbulent field under a condition of minimally possible integrated aerodynamic resistance of 3-D PS;

Each level of hierarchy realizes maximum transformation of a DVAS turbulent field if the following conditions are achieved:
(a) Every ETT experiences flows around the ETT by the local flow generated by DVAS in the area of ETT localization;
(b) Form, sizes and orientation of every ETT in each level of hierarchy provide transformations of DVAS turbulent streams in the area of defined stream and ETT joint localization;
(c) Individual ETT do not shield each other at any level of hierarchy at partial or full overlapping of the areas of DVAS and 3-D PS interaction;
(d) Defined quantity of an ETT forming an elementary cluster (3-D EC) has the aerodynamic opacity for the dominant DVAS streams 100% overlapping of all current streamlets. This means that an initial atmospheric stream is completely transformed into a set of secondary flows with changed velocity and turbulence characteristics;

(e) Defined quantity of an elementary cluster 3-D EC forming the protective structure 3-D PS also has the aerodynamic opacity for the dominant DVAS streams 100% overlapping of all current streamlets. This means that the defined volume of DVAS is completely transformed into a set of secondary flows with the changed characteristics of velocity and turbulence;

(f) Each structure Ax, Ay, Az as a whole, has an aerodynamic resistance Ra (x,y,z) in X, Y, Z directions less than the corresponding critical level of the aerodynamic resistance Rac (x,y,z), sufficient for destruction of this structure by DVAS in the defined range of DVAS parameters.

Figure 6:
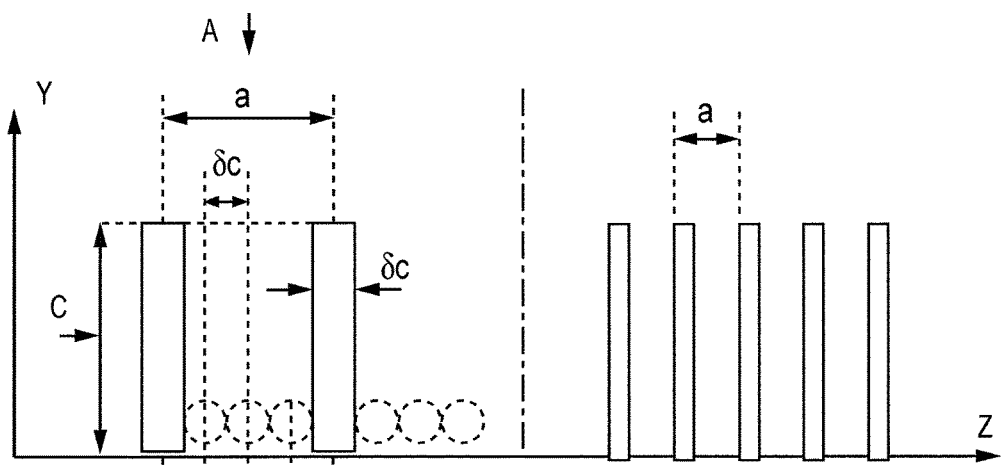
FIG. 6 schematically shows a sample of a preferred elementary 2-D plane layer (a), a preferred 2-D periodic structure (b), and a preferred structure of an elementary 3-D space cluster (c).
Figure 6:
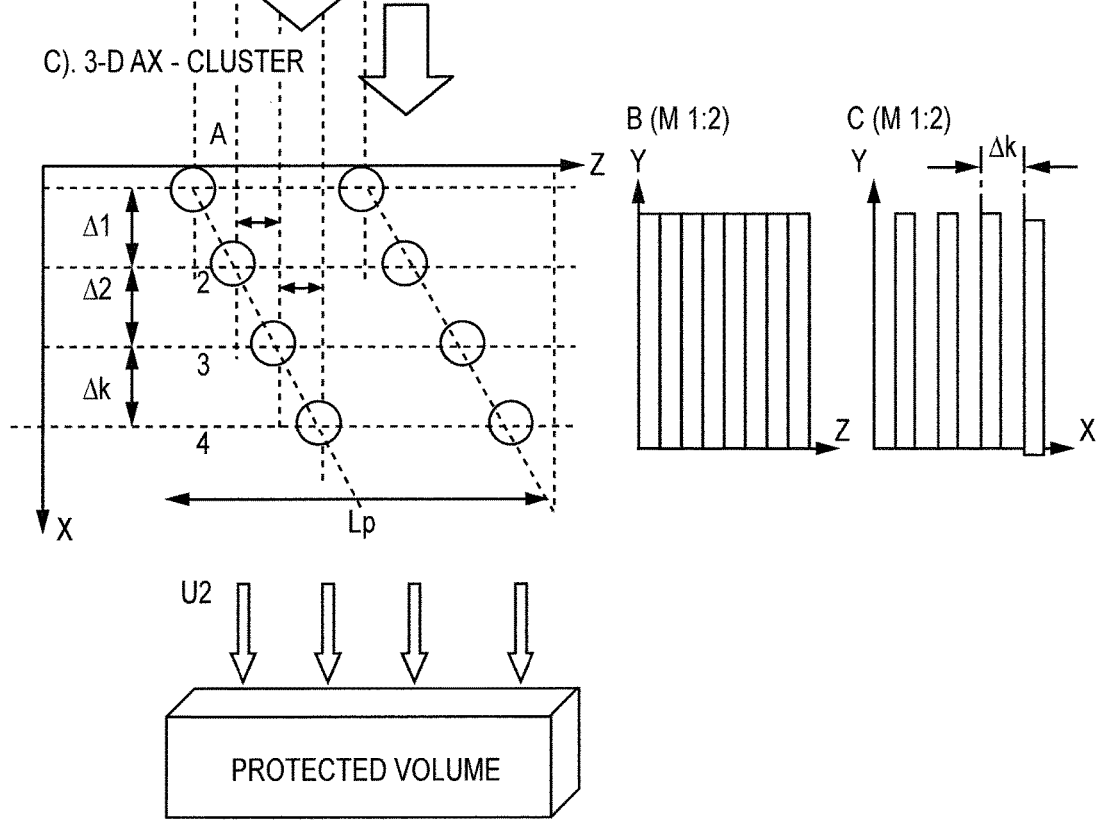

An example of a 5 level Ax protective structure construction for any arbitrary directed stream velocity vector, Ux is presented in FIG. 6. As an elementary converter of turbulence, a cylindrically shaped ETT is used with diameter $\delta c$ and length C. The ETT is made from a random material. An elementary plane layer, 2-D Plane Layer, is characterized by the open contour formed by two parallel and spaced apart cylinders with diameter $\delta c$, length C, located perpendicularly to the velocity vector U1. This configuration is depicted in FIG. 6a. The cylindrical ETT are spaced apart a distance a. In this particular arrangement distance a, is equal to approximately three diameters of the ETT.

A periodic two dimensional structure, 2-D PS, represents a set of plane layers located within a single plane such as plane YZ. This configuration is depicted in FIG. 6b.

An elementary spatial cluster, 3-D Ax-Cluster, in this example, is formed by N numbers of the elementary 2-D layers located along the planes YkZk ($1 \leq k \leq N$), by means of shifting of each subsequent layer along axis Z at distance $\delta c$ and along axis X at distance $\Delta k$. This configuration is depicted in FIG. 6c. The value $\Delta k$ for each subsequent layer along axis X is greater than a length of the turbulent trace resulting from interaction between the ETT and a DVAS stream. Specifically, in the particular arrangement of ETTs shown in FIG. 6c, the ETTs are arranged relative to air flow (represented by velocity vector U1) such that each ETT is exposed to the relatively linear air flows. As a result of this arrangement, no ETT is hidden or shielded by another ETT. The term "aerodynamically opaque" refers to this type of arrangement. This preferred arrangement is depicted by the view of the ETTs taken along the x-axis, such that axes Y and Z are visible. The ETTs are also preferably arranged such that when the collection of ETTs are viewed along a transverse axis such as the z-axis, the ETTs are aligned and spaced apart in a row-like fashion.

Every ideal elementary cluster, organized in a similar fashion, has the following base properties:

(a) ideal cluster is aerodynamically opaque for DVAS stream with velocity vector U, so all current streamlets interact with all ETT implemented in this cluster;

(b) integrated aerodynamic resistance of the ideal cluster is defined by the sum of aerodynamic resistances of all two dimensional layers located at this cluster;

(c) aerodynamic resistance of each two dimensional layer located at this cluster is significantly less than the aerodynamic resistance of the surface limited by the contours of a layer.

The quantity of two dimensional layers, NpI, which is necessary and sufficient for the achievement of aerodynamic opacity of an elementary cluster represented in FIG. 6c is defined by the equation (V):

$$NpI = a \cdot \delta c / \delta c + 1 = a / \delta c \text{ at } a >> \delta c \quad (V)$$

In this equation, a is the period of the two dimensional structure. Each subsequent layer is shifted on axis X at distance $\Delta$, and on axis Z at distance $\delta c$.

If an elementary plane layer, 2-D Plane Layer, is formed by T elements of ETT, the total amount of ETT in an ideal Ax type cluster represented in FIG. 6, is defined as:

$$METT = NpIT = aT/\delta c \quad (VI)$$

Described as an example, a similar elementary ideal Ax cluster provides 100% overlapping of current streamlets with velocity vector Ux. The length of front zone Lp protected by the cluster of similar kind is equal to a double length of a two dimensional layer, Lp=2a. See FIG. 6. The distance of the spatial shift $\Delta$, is chosen by calculation of the average length of a trace of the secondary flows around an ETT.

Figure 7:
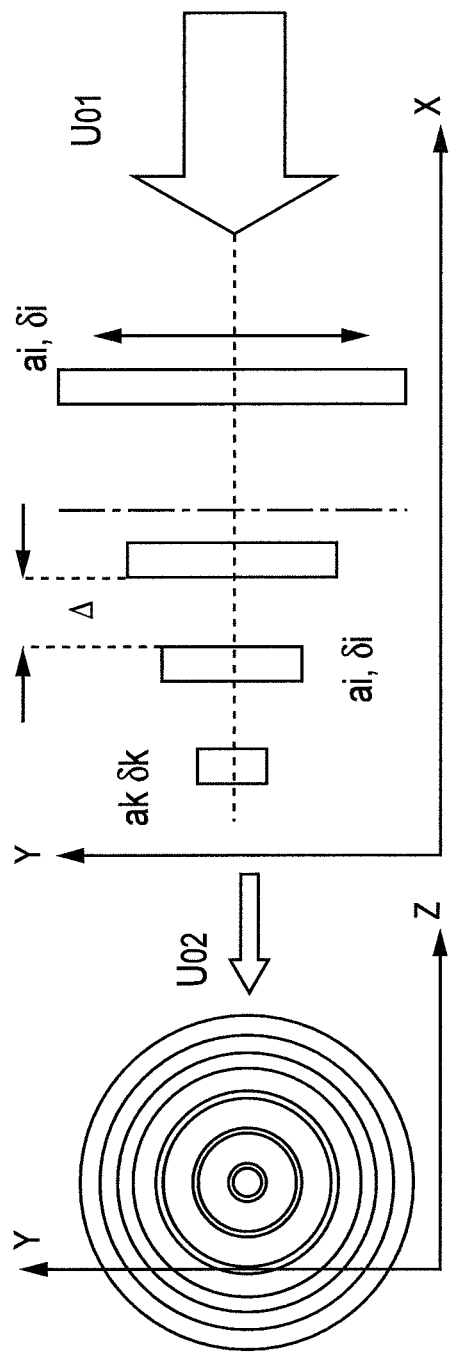
FIG. 7 schematically shows the structure of a preferred elementary 3-D ring cluster.

An example of another elementary Ax cluster is illustrated in FIG. 7. The cluster is formed by a set of K flat rings with different diameter $\delta i$ and width $\delta i$, formed from a disk with diameter A and placed at distance $\Delta$ from each other along the axis X. Each ring defines an outer radius RS (not shown in FIG. 7) and an inner radius R1 (not shown in FIG. 7). The inner radius R1 defines the inner aperture or opening of the ring. Total aerodynamic resistance of all rings in direction X is proportional to their total surface area and equal to the surface area of the solid disk. But the aerodynamic resistance of each elementary ring is defined by its effective area $Seff = \pi(Ri^2 1 - Ri^2 2)$ only and can be made extremely small.

Each ring represents a two dimensional layer, e.g., 2-D Plane Layer, and plays a role as an elementary turbulence transformer (converter) ETT in the ring form. Instead of rings, various configurations of other contours can be used, but the most convenient implementation from a technical and engineering point of view uses rectangular contours or frameworks formed by cylindrical bars. Additional configurations for ETTs include, but are not limited to, other two dimensional layers and 3-D clusters.

As described in Varaksin A, "Turbulent Particle Laden Gas Flows," Springer-Verlag Berlin Heidelberg, 2007, any physical object of any geometry capable of producing external flow streams, starts to generate secondary turbulent flow under conditions of equation (II). The production of 2-D plane layers and, on their basis, 3-D clusters, depends upon their physical implementation and construction. So, for example, ETT can be made from rectangular, triangular, polygonal, ring-like and other contours, and also physical objects of any other shapes, allowing the design of plane layers, periodic and irregular two dimensional structures and corresponding clusters.

In a preferred embodiment, the invention includes the use in one elementary layer or in a two dimensional structure, a wide range of various geometries and physical characteristics for ETT, identical ETT but with different sizes, and other combinations and geometries of ETT.

Preferred 3-D cluster structures provide a significant amount of interaction between ETT in each layer and an external stream and, whenever possible, exclude any effect(s) of shielding of ETT upon other ETTs. An ideal 3-D cluster should be 100% aerodynamically opaque to all current streamlets with the velocity vector U perpendicularly oriented to a plane of each elementary layer. Each separate two dimensional layer should have a high level of aerodynamic transparency and, accordingly, a relatively low level of aerodynamic resistance.

A prime consideration in designing similar clusters for a protective structure is providing an integrated aerodynamic resistance of an entire cluster. This represents an aerodynamically opaque obstacle for DVAS which is equally divided between all layers and all two dimensional structures with the reduced aerodynamic resistance of each layer and each structure residing in the cluster. This allows clusters to maintain requisite power loads in the zone of a DVAS.

Dominant power loads generated by a DVAS are defined by a gradient of pressure $\Delta P$ ($-r$) defined by the rotation of DVAS with tangential velocity $U\phi$ and directed to the center of the DVAS, see FIGS. 1 and 4. The total force Fs on the surface of an object with an effective total area of the object, Seff, is defined by equation (VII) as:

$$Fs = \Delta P Seff = \rho U^2 \phi Seff/2 \tag{VII}$$

The relation between average values of the pressure differences $\Delta P$ and values of total forces Fs for the categories of tornado F0-F5 are presented in Table 2. Power loads are calculated per 1 m² of a solid surface.

TABLE 2

Pressure Differences and Total Forces Based on Tornado Scale

| Fujita Scale | F0 | F1 | F2 | F3 | F4 | F5 |
|---|---|---|---|---|---|---|
| U$\phi$ (m/s) | 25 | 42 | 60 | 82 | 105 | 130 |
| $\Delta P$ (N/m2) Pa-Pascal | 375 | 1,060 | 2,160 | 4,053 | 6,615 | 10,140 |
| Fs (N) N-Newton | 375 | 1,060 | 2,160 | 4,053 | 6,615 | 10,140 |

From Table 2 it will be understood that the most common tornadoes, i.e., F0-F3, cause significant power loads per area of a solid surface that lead to inevitable destruction of ground objects possessing significant aerodynamic resistance. See Boruff B. J., Easoz J. A., Jones S. D. et al., "Tornado Hazards in the United States, "Climate Research," 2003, V. 24, No. 2, P. 103-117.

For this reason, use of the preferred embodiment protective structures in accordance with the present invention, is believed to provide significant savings in terms of financial assets, human efforts, and lives.

Protective cluster structures allow maintenance of significant power loads in the zone of a DVAS, simultaneously influence the DVAS during all phases of interaction, and ideally lead to destruction of the DVAS.

Theoretically, the region along the length of a front line Lpr, can be significantly and effectively protected from DVAS, by creation of three ideal 3-D cluster types Ax, Ay, Az in which the planes of an arrangement of two dimensional periodic structures are arranged perpendicularly to each other. However, in real conditions, practical implementation of three high grade ideal 3-D clusters, encounters various difficulties relating to engineering and economic aspects.

Numerous modeling experiments of destabilization and destruction of dynamic vortex structures have demonstrated that in many situations, it is sufficient to use simple and reliable quasi cluster protective designs. These structures are capable of generating powerful turbulent fields of secondary flows and provide effective interactions based on the relative distance with tangential $U\phi$, radial Ur and vertical Uy components of velocity of the dominant streams of DVAS. See FIGS. 1 and 4.

In accordance with the present invention, a universal model of a quasi cluster protective structure 3-D PS, is provided. The preferred embodiment structure comprises one or more discrete modular elements or their quantitative, configuration and/or spatial combinations, which thereby creates the greatest possible asymmetry and efficiency of influence of secondary turbulent streams on DVAS.

A base modular element in the preferred embodiment three dimensional protective structure 3-D PS is a two dimensional protective structure 2-D PS. FIG. 8*a*, illustrates various combinations of sizes, diameters and orientation of ETT in two dimensional protective structures, which can form various Ax, Ay, Az clusters or quasi cluster systems. These are schematically depicted as grids A, B, and C. FIG. 8*b* schematically illustrates a preferred embodiment three dimensional quasi cluster providing effective interactions with atmospheric vortex currents of various types. FIG. 8*b* also depicts tilting one or more components of the quasi cluster as desired.

Figure 9:
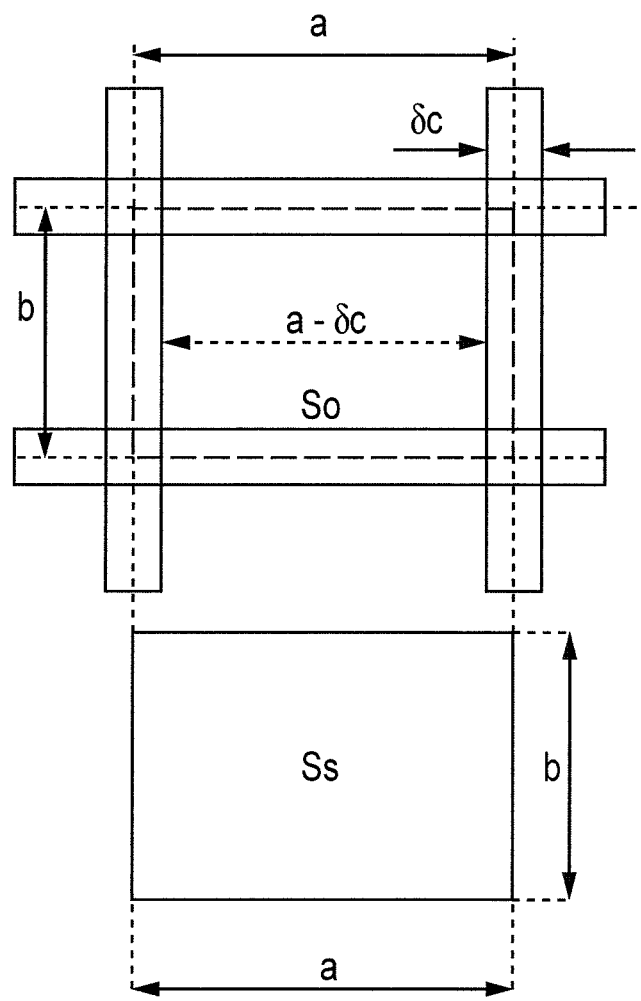
FIG. 9 schematically shows a cross section of an elementary 2-D plane layer created by an assembly of four cylindrical elementary turbulent transformers (ETT).

FIG. 9 illustrates the integrated aerodynamic resistance of the periodic two dimensional protective structure 2-D PS with length a, height b and thickness $\delta$. The aerodynamic resistance is defined by parameters and quantity of two dimensional layers, 2D PL or individual cells, represented by the closed rectangular in FIG. 9, formed by four cylindrical ETT with diameter $\delta$ oriented in the directions a and b. The area of effective section with the square Seff defines the aerodynamic resistance of each individual cell in the two dimensional structure shown in FIG. 9.

The effective (working) area of this structure can be defined from equation (VIII):

$$Seff = Ss - So = ab - [(a-\delta)(b-\delta)] = (a+b)\delta - \delta^2 \sim (a+b) \tag{VIII}$$

If a, b >> $\delta$

Seff=2a$\delta$, if a=b

In equation (VIII), Ss is the full area of the section of an a,b cell and So is the area of the removed or void portion. The relation between the effective area Seff and the area of the solid part Ss is equal to the relation of the aerodynamic resistances and also the relation of the power loads at the specified pressure gradient. This is shown in equation (IX):

$$K = \Delta PFSeff/\Delta PFSs = \sim(a+b)/ab = \delta/a + \delta/b \tag{IX}$$

From (VIII) it follows, that the relation between the diameter of a cylindrical ETT and the side of a cell entirely define the value of effective cross section of aerodynamic resistance of a similar layer. For a square cell (a=b), equation (IX) reduces to equation (X):

$$K = 2\delta/a \tag{X}$$

If K=1, the power load on a similar cell is equal to the power load on the solid surface limited by a contour of a cell as shown in FIG. 9. By K=1/N, the aerodynamic resistance as well as total power load is N times less.

Regarding aerodynamic resistance, an individual cell of a two dimensional individual layer formed by a cylindrical ETT as shown in FIG. 9, can be N times less than the aerodynamic resistance of a solid surface. This allows the use of similar modules in different types of protective systems. That is, similar modules can be used, without fear of their destruction by dynamic force loads.

For example, an individual cell of a two dimensional layer as shown in FIG. 9 formed by cylindrical ETT with the length a=1.0 m and diameter $\delta$=0.005 m, has 100 times smaller aerodynamic resistance and force load than the corresponding solid surface defined by its contours.

Thus a preferred embodiment three dimensional protective system 3-D PS, formed from the preferred quasi cluster modules depicted in FIG. 8*b*, under condition K=1/N for each periodic two dimensional structure represented in FIG. 8*a*, will have N times less aerodynamic resistance, than any object with the same effective surface.

Figure 10:
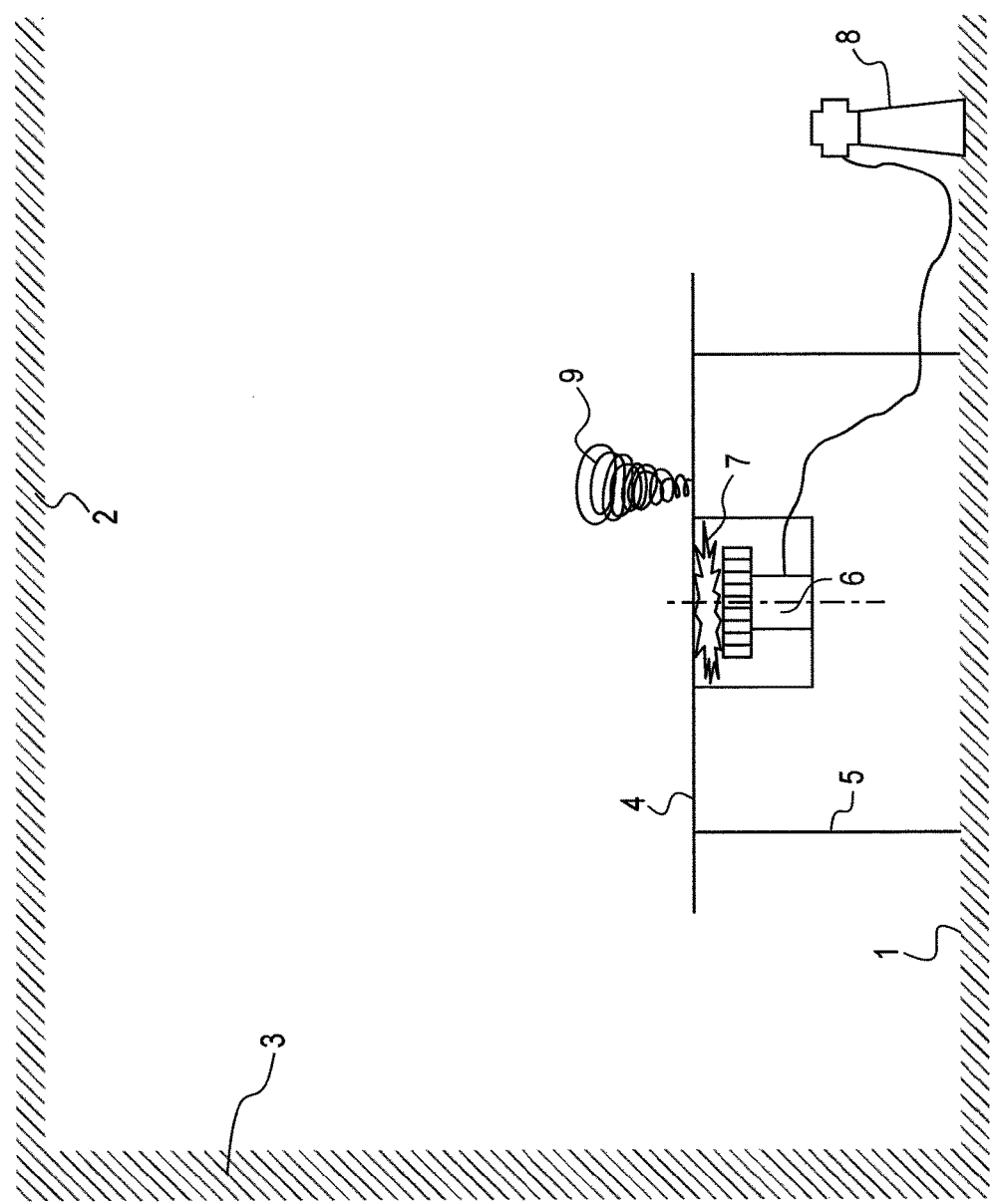
FIG. 10 schematically illustrates an equipment configuration used in various investigations described herein.

A series of investigations were performed to further evaluate the methods, systems, and protective structures provided in accordance with the present invention. A testing configuration is schematically shown in FIG. 10. The equipment was located in a room with floor 1, 6 m by 6 m in area and ceiling 2, 3.3 m high at a distance of 0.5 m from one of walls 3. The equipment included a deck 4, 0.35 m high with three legs 5. The horizontal surface of the deck 4 was provided by a circular sheet of aluminum (grade D16AM) 1100 mm in diameter and 1.5 mm thick. The top surface of the aluminum sheet was blackened with heat-resistant paint. Placed under the deck was an electrically ignited gas burner 6 of maximal thermal power of 3.5 kW. The diameter of the flame 7 of the burner was varied (for different modes of thermal power) from 200 to 300 mm. A liquefied propane-butane mixture required for the operation of the gas burner was stored in a 27 liter vessel 8.

This equipment configuration enabled the controlled heating of the surface of the aluminum sheet, which led to the generation of unsteady vortex structures 9 as a result of development of unstable stratification of air. The vortex structures formed were visualized using tracer particles. The tracer particles were micrometer-sized particles of magnesia, chemical formula $4MgCO_3Mg(OH)_2 4H_2O$, or vapor of special easily boiling fluid (VDLSL5, Velleman company, Belgium) which were applied in a thin layer onto the underlying surface prior to each trial.

A digital video camera (Sanyo VCC-6572P) was used for video filming of vortices being generated.

An infrared thermometer (model AZ8868) was used for measuring the temperature of the surface of the aluminum sheet. The measurements of air temperature above the aluminum surface were made by use of chromyl-alumele thermocouples. The surface temperature measurements were taken along the radius of the aluminum sheet at six locations with coordinates r=0, 100, 200, 300, 400, and 500 mm (r is the distance from the sheet center). The air temperature measurements were taken along the same horizontal locations and at varying heights above the aluminum sheet, y=50, 100, 200 and 300 mm (y is the distance from the sheet surface in the vertical direction).

Also monitored during the course of the investigations was the air temperature in the room. The initial (prior to investigations) difference between the air temperature along the aluminum surface $T_1$ and the temperature of air in the vicinity of the room ceiling $T_2$ was $\Delta T = T_2 - T_1°$ C. The maximum increase in the air temperature in the vicinity of the ceiling after a single experiment in one thermal mode (see below) reached a value of from about 3° C. to about 4° C. Further investigations were performed after complete cooling off of the room to initial values of temperature.

Table 3 lists the principal parameters of thermal modes employed for generation and study of the characteristics of air vortices.

TABLE 3

Principal Characteristics of the Experimental Modes

| No. | Mode of Heating | Heating Time $T_h$, s | Cooling Time $T_c$, s | Maximum Temperature $T_{c\ max}$, K |
|---|---|---|---|---|
| 1 | Weak | 60 | 600 | 420 |
| 2 | | 120 | 900 | 470 |
| 3 | | 180 | 1,200 | 500 |
| 4 | | 60 | 600 | 500 |
| 5 | Strong | 120 | 900 | 580 |
| 6 | | 180 | 1,200 | 610 |

Figure 14A:
FIGS. 14a and 14b are photographs of lab created tornadoes described herein.
Figure 14B:
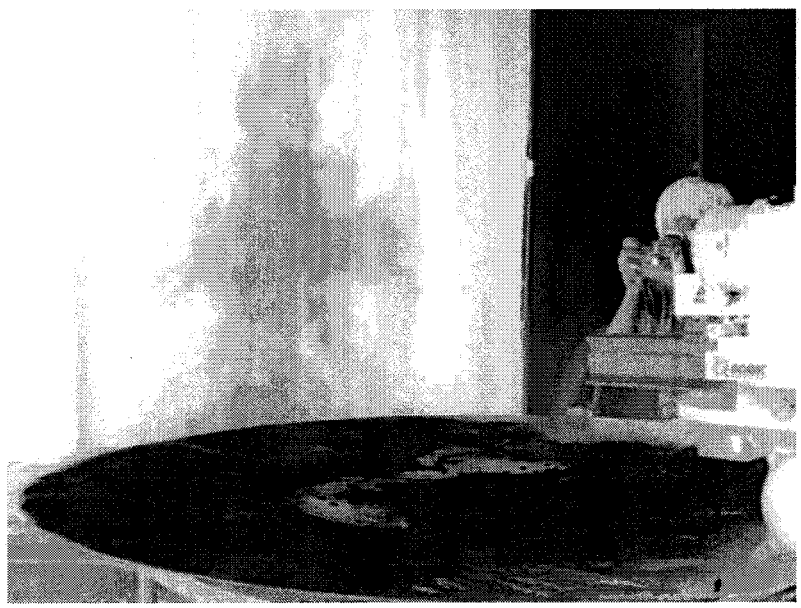

The investigations were directed to assess the interactions between lab created tornadoes and vertically oriented single grids. As will be understood, the vertically oriented single grids correspond to preferred embodiment protective structure(s). The equipment setup was used in multiple investigations and provided generation of a lab created tornado with different height, diameter and rotational velocity. The interior structure of the lab generated tornadoes is seen in FIGS. 14a and 14b. The maximum height of the lab generated tornadoes reached 2.0 m with the diameter of the funnel being approximately 0.1 m and $U\phi$ m=1.0 m/sec.

Selected video frames of a lab created tornado interacting with a single grid, which led to its disintegration, are shown in FIGS. 15a, 15b, 15c, and 15d.

Figure 15A:
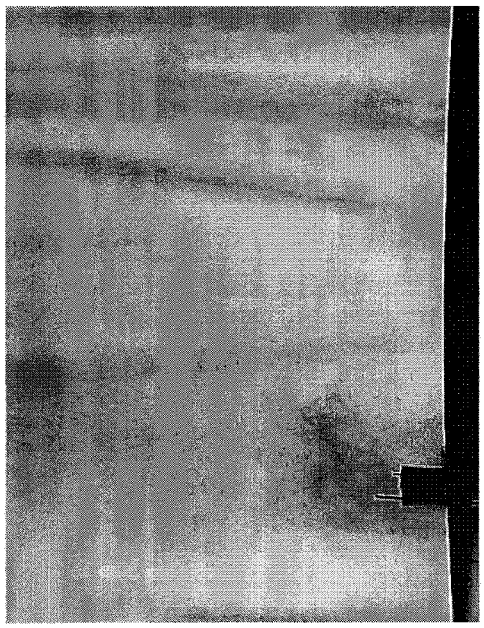
FIGS. 15a-15d are time sequence photographs of lab created tornadoes described herein.
Figure 15B:
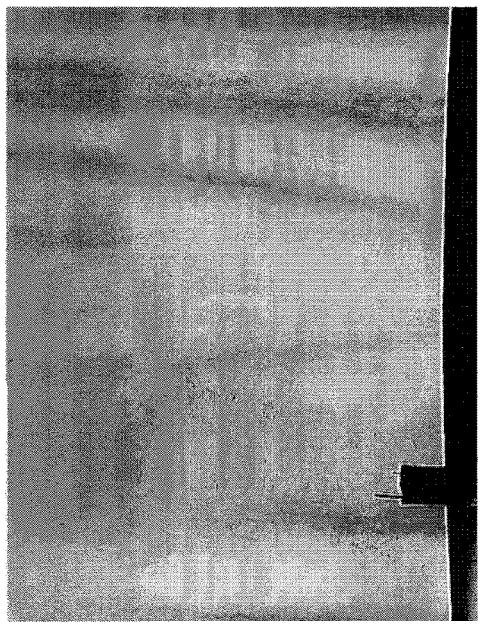
Figure 15C:
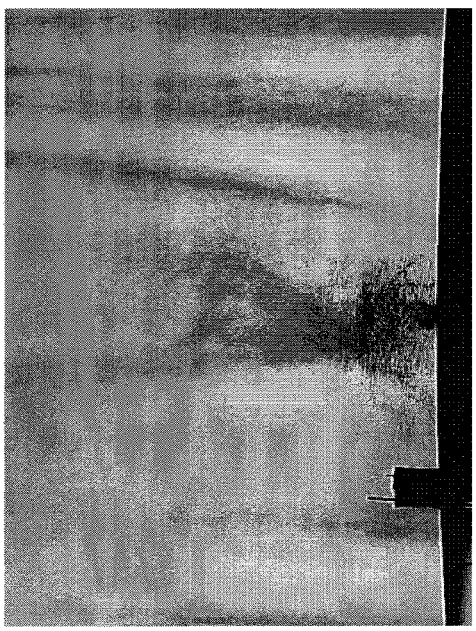
Figure 15D:
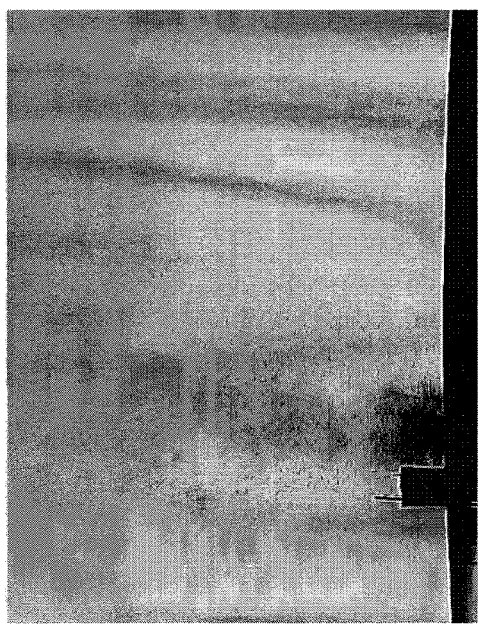

Each picture corresponds to a particular time, measured from the moment of origination of the vortex. The obtained series of images provides a qualitative analysis of the effect of obstacles such as vertical grids on the dynamics of the lab generated tornado. In the first set of photos at times of 1.50 and 2.75 seconds (FIGS. 15a and 15b, respectively) a uniform motion of the vortex structure from right to left is illustrated with the velocity (perpendicular to the direction of the grid) equal to 0.14 m/sec. Next, selected photos at times 3.0 and 3.75 seconds (FIGS. 15c and 15d, respectively) show the lab generated tornado and the grid (FIG. 15c) and its disintegration (FIG. 15d). Characteristic processes that accompanied the collapse of the vortex include 1) cessation of the vortex motion of particles, 2) removal of the last portion of particles from the underlying aluminum surface, and 3) the absence of any new pickup of particles in the region.

Figure 16:
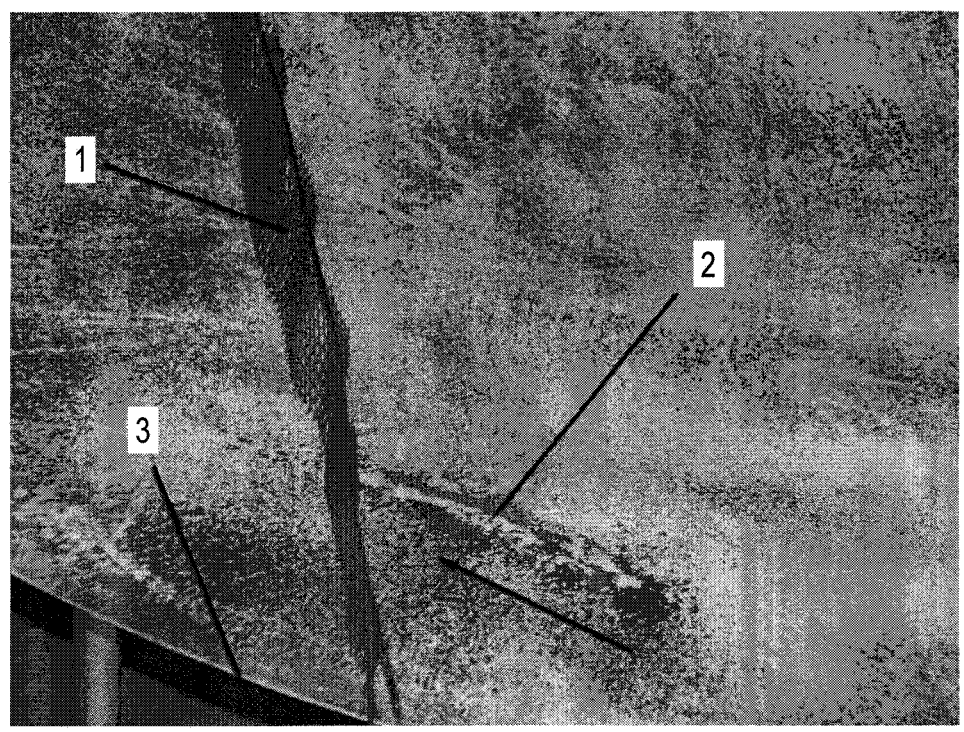
FIG. 16 is a photograph showing certain evidence and characteristics of a tornado.
Figure 17A:
FIGS. 17a-17f are time sequence photographs of a lab created tornado undergoing destabilization and destruction by a preferred embodiment protective structure in accordance with the present invention.
Figure 17B:
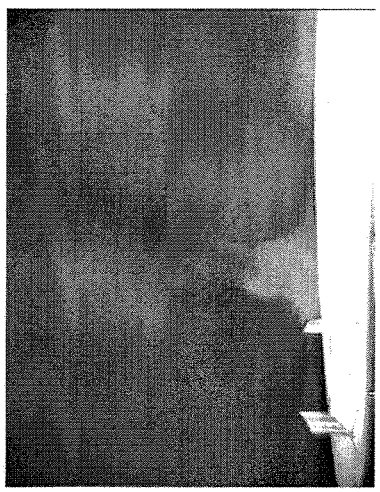
Figure 17C:
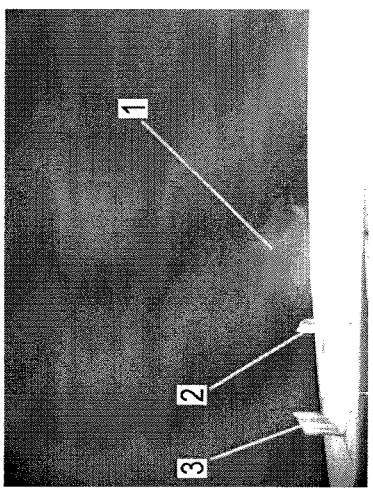
Figure 17D:
Figure 17E:
Figure 17F:

A typical example of the trace or path of the lab created tornado on the underlying aluminum surface as it moved toward the grid and subsequently disintegrated is shown in FIG. 16. In this figure, the grid 1 is shown having a collection of relatively fine cells or ETTs. The trace or path of the tornado is shown as 2. And the edge 3 is the edge of the underlying aluminum surface. The arrow shows the direction of motion of the tornado. In this photograph, the trace of the vortex structure is clearly evident, which is almost a straight line. Generation of the vortex structure occurred and the vortex structure moved toward the grid, and disintegrated. The disintegration was evident as a break or a discontinuous portion of the trace or path which occurred at the grid. Trajectory length was about 0.25 m.

The following addresses interactions between lab created tornadoes and vertically oriented binary grids with different parameters.

Selected video frames of a lab created tornado with maximum power interacting with a collection of binary grids, which led to its disintegration, are shown in FIGS. 17a-17f. The time periods of the figures are 1.70, 1.86, 2.14, 2.42, 2.50, and 3.26 seconds, respectively.

An analysis of the interaction between lab created tornadoes and vertical grids with different geometries using cylindrical wire for ETTs, provided the following comprehensive parameter that takes into account the geometry of the grid, i.e., the protective structure. This parameter G is defined as shown in equation (XI):

$$G = \frac{hd}{a} \quad (XI)$$

In this equation, h is the height of the grid, d is the diameter of the cylindrical wire (ETT), and a is a typical cell's scale.

In determining equation (XI), the conditions of destruction of lab created tornadoes were evaluated using eight grids with different values of the parameter G in the range G=0.0005 to 0.01 m. The grid with the minimum value of G has h=0.01 m, d=$10^{-4}$ m and a=2·$10^{-3}$ m. The grid with the maximum value of G has h=0.06 m, d=2·$10^{-3}$ m and a=1.2·$10^{-2}$ m.

The linear energy (energy of one linear meter of the tornado height) of the lab created tornadoes was determined as shown in equation (XII):

$$E = \rho \frac{\pi D^2}{4} \frac{V^2}{2} \quad (XII)$$

Figure 11:
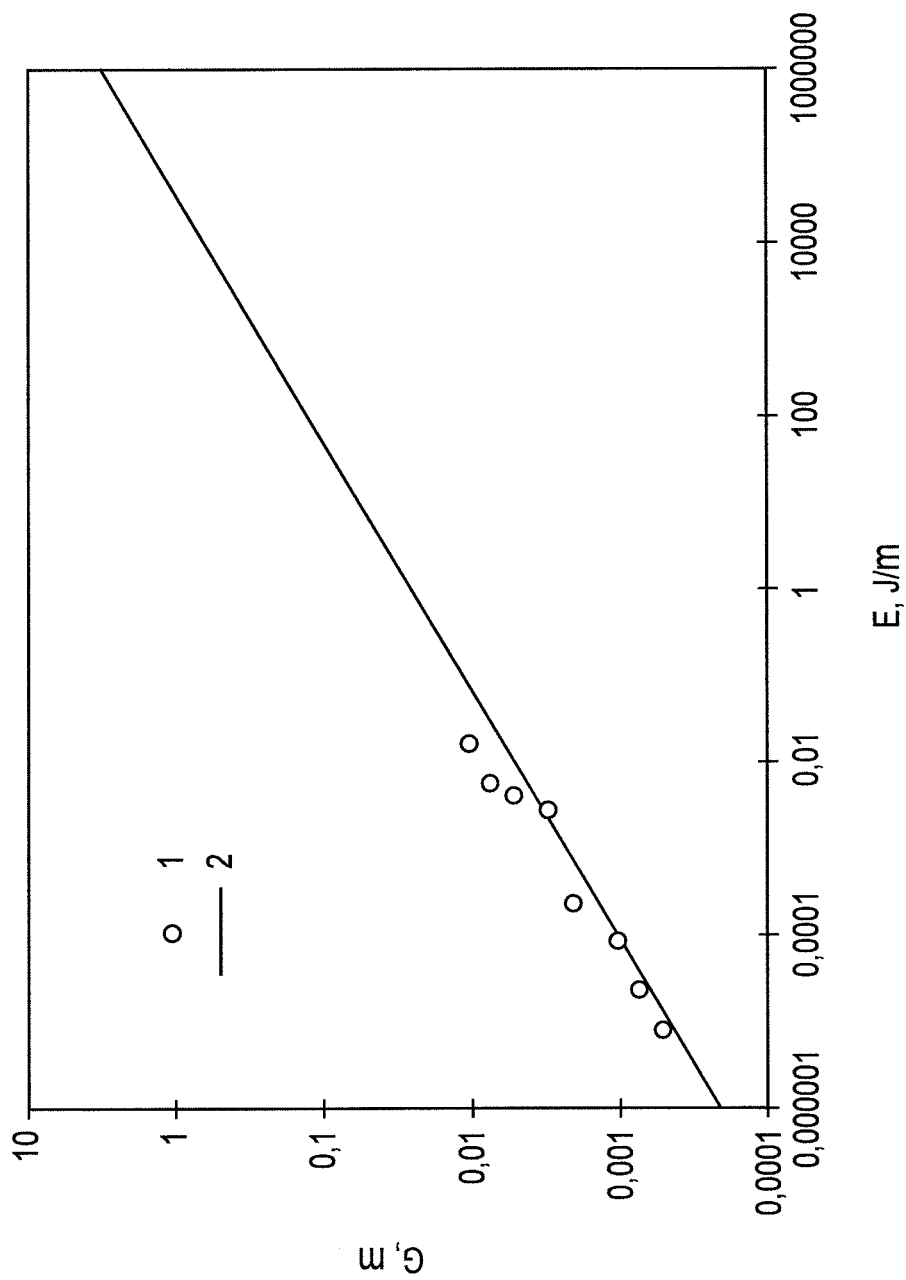
FIG. 11 is a graph illustrating correlation between the energy of a tornado and parameters of a preferred embodiment protective system used for destabilization of the tornado.

In equation (XII), p is air density; D is diameter of the tornado; and V is vertical velocity in the center of the vortex (V>>>U$\phi$, as was measured in the investigations). The determination of the energy of the lab created tornadoes disintegrated by vertical grids with different geometries, led to a correlation of a tornado-grid interaction which is shown in FIG. 11. Referring to that figure, the abscissa or x values represent the linear energy of tornadoes and the ordinate or y values represent G values. The various measurements or data are indicated by circles 1. And a linearly extrapolated line is shown as item 2. The G values provide an indication as to the effect of a grid or protective structure upon destabilization and disintegration of the DVAS.

In certain embodiments, it is preferred to configure the protective systems such as clusters or quasi clusters of ETTs to have particular proportions or characteristics. Thus, preferably the parameter G for a cluster exhibits a value of from about 0.0001 to about 10 m, more preferably from about 0.001 to about 1 m, and most preferably about 1 m. It will be understood that the invention is not limited to the use of clusters exhibiting these G values. Instead, the invention includes clusters exhibiting different G values outside of these ranges. Representative preferred shapes and sizes for the ETTs can vary in order to produce the desired G parameter value. However, cylindrical ETTs having a diameter of from about 1 to about 50 mm, and preferably from about 5 to about 10 mm are preferred.

Figure 8:
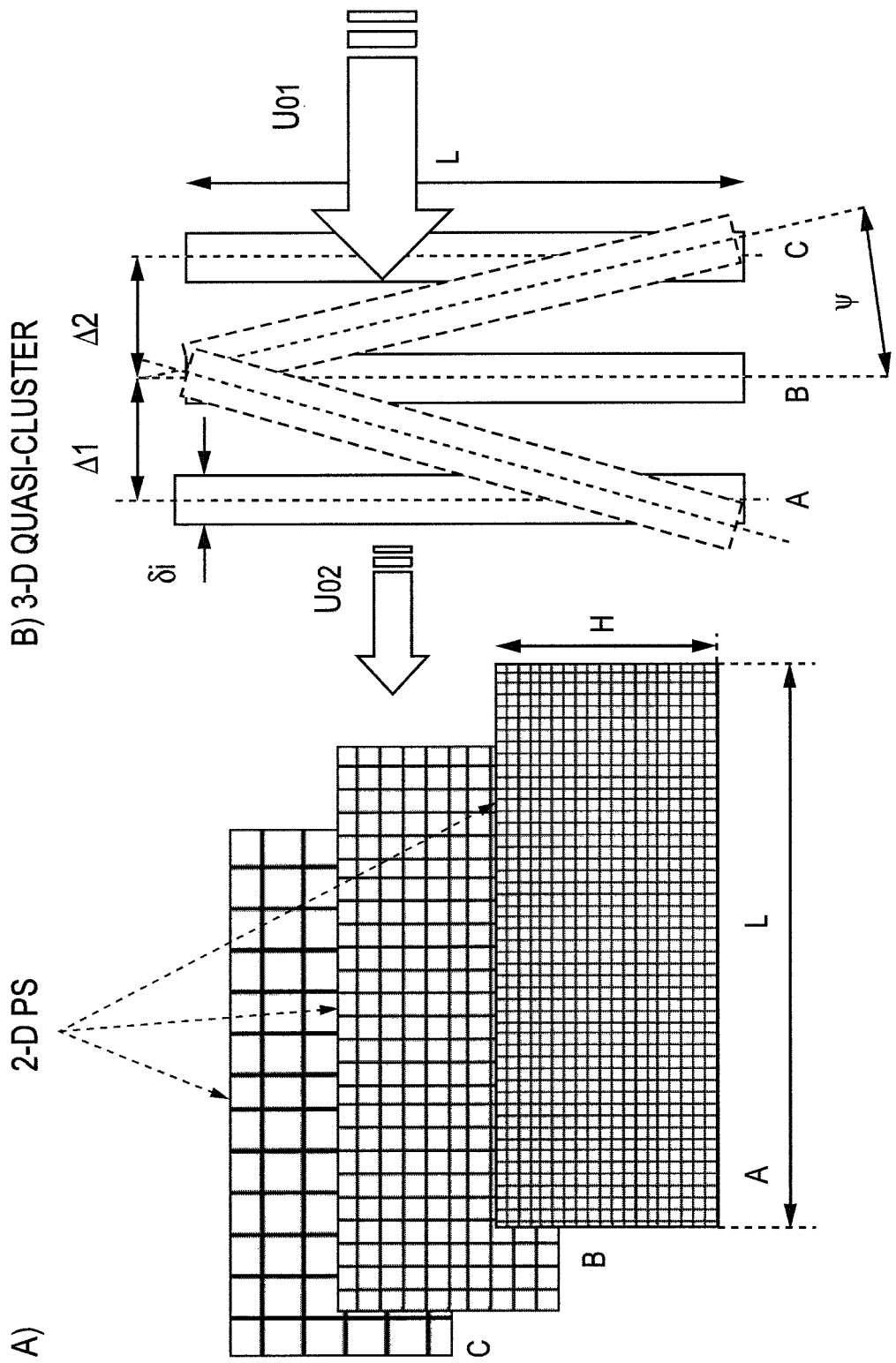
FIG. 8 schematically shows a preferred embodiment 2-D periodic structure (a) and a preferred embodiment structure of a 3-D space quasi cluster (b).

In order to destabilize real tornadoes such as tornadoes in categories F0-F4, it is preferred to arrange one or a few series of quasi cluster grid modules such as those shown in FIG. 8, with a parameter G close to 1.0 m (see FIG. 11). The modules are preferably orthogonally oriented to the radial and azimuthal velocity of the vortex structure.

Since a tornado is unusually varied by the diameter of the funnel, height, speed and trajectory, the construction of the modular units of a protective system cannot be clearly defined. However, such construction typically involves a number of options. The location of the quasi cluster grid modules has an optimal compliance rate dependent upon a particular type of tornado. However, regardless of the particular location and/or orientation of a quasi cluster grid module, it is preferred that the parameters of the module be selected in accordance with equation (XI) in order to destabilize and ultimately destruct the vortex structure of a tornado.

Figure 12:
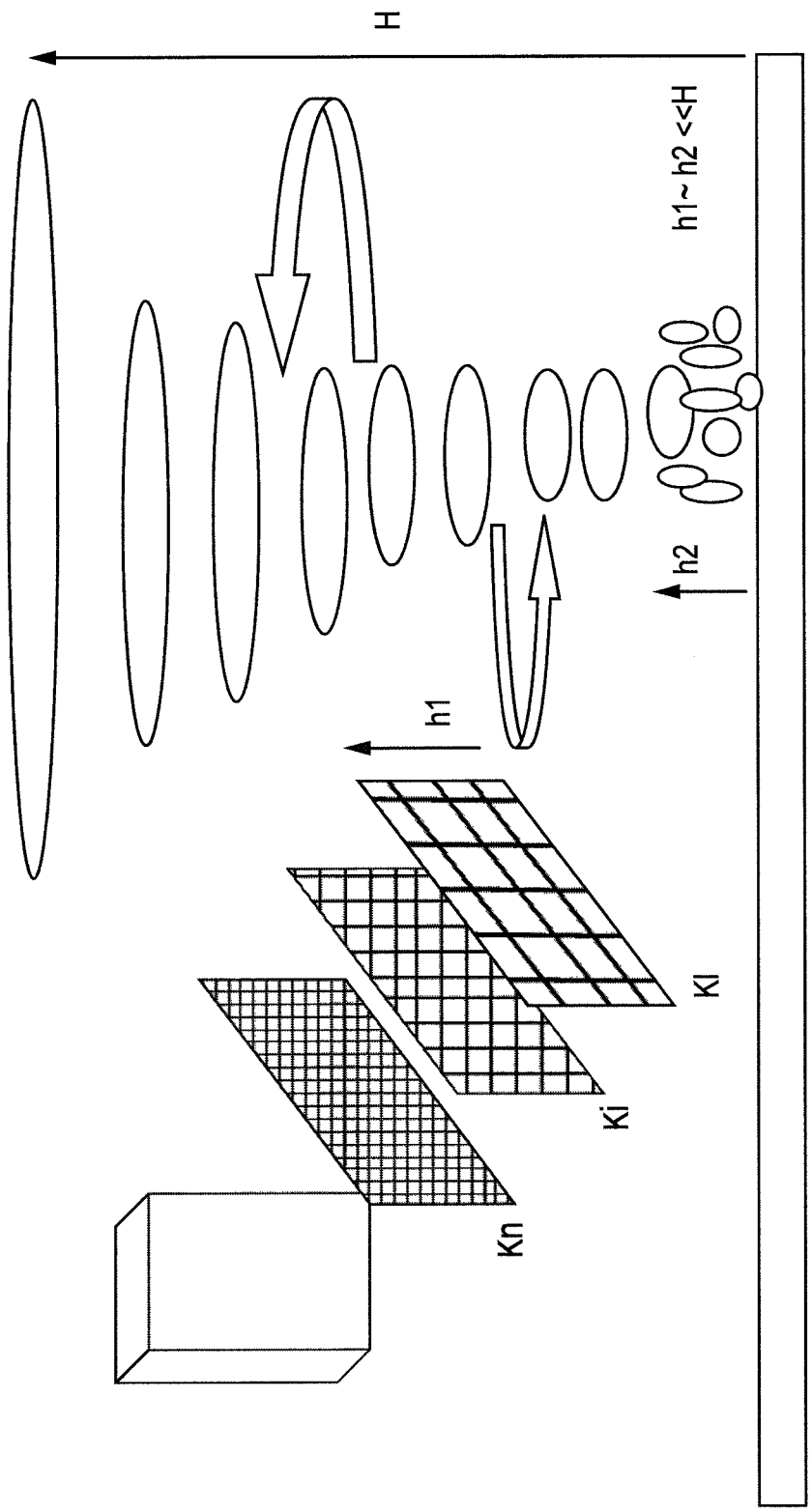
FIG. 12 schematically illustrates a preferred embodiment 2-D protective system.

A preferred embodiment 2D or a 3D cluster or quasi cluster structure assembled from single grids with equal or different G values is shown in FIG. 8. As was determined in the noted investigations, the minimal height of the grids is preferably greater than 0.04 H, where H is the average height of the real tornado and h1 is the height of the grid used such as shown in FIG. 12. The variable $h_2$ in many instances, may be negligible. This parameter represents the height from the ground to the lowest point of the DVAS. This variable may be measurable for DVAS which have not reached the ground. To realize the cluster effect for an entire protective system, each grid should have the parameter G close to 1.0 m but utilize a different value of ki=di/ai, see FIG. 12a. The length of the grids is preferably more than the length of the area to be protected. Space configurations of the grids used in a concrete protective system can be varied from linear and parallel to a closed array such as shown in FIGS. 13a-13b. But the entire protective system preferably creates the maximum anisotropic properties by interaction with tornadoes corresponding to the secondary fields of pressure, velocity and turbulence. The distance between grids is preferably more than the length of the secondary streams generated by the tornado.

In certain embodiments, it is preferred to utilize protective systems such as clusters or quasi clusters of ETTs to have certain heights. These heights can be expressed in terms of the height of a tornado or other atmospheric vortex structure. Typically, the cluster has a height of at least 4% of the height of the vortex structure, more preferably a height of at least 6% of the height of the vortex structure, and most preferably a height of at least 10% of the vortex structure. The various references to height of the cluster or protective system refers to the average height of the cluster or protective system as measured from the ground to the highest location of ETTs, averaged along the length or side(s) of the protective system. It will be appreciated that the invention includes clusters having other heights and in no way is the invention limited to these particular heights. Typical heights of a tornado and particularly of the height of the visible portion of the tornado, range from about 200 m to about 500 m. However, the invention is also directed to tornadoes having shorter heights such as from about 50 m, more typically 100 m, and more typically 150 m in height. In addition, the invention is also directed to tornadoes having greater heights such as up to about 600 m, or 800 m, or 1,000 m or even greater heights.

FIG. 13a shows a preferred embodiment 2-D honeycomb like protective system assembled from several 3-D periodic N side modules. The protective system shown in FIG. 13a is assembled from equal units of hexagonal form in which every side of each hexagonal cell is a grid with the height h and different rate ki=di/ai, as shown in FIG. 8, but all parameters of each grid satisfy the equation (XI) and the value of G=1. Being assembled in a honeycomb structure with a number of the rows such as depicted in FIG. 13a, this protective system performs as a 2D quasi cluster structure and generated the most effective secondary aerodynamic flows by interaction with the vortex streams of a tornado. Instead of the hexagonal units, another preferred embodiment protective system could utilize units having triangular, square or any other arbitrary form, but the hexagonal form provides the most stability for an entire protective system.

The protective system shown in FIG. 13b is assembled from a number of triangular shaped units in which every plane grid side has a different ki=di/ai. The entire protective system is referred to herein as a 3-D saw construction. This protective system utilizes a plurality of triangular shaped modules preferably arranged in rows of oppositely oriented triangular modules as shown.

The protective system shown in FIG. 13c is assembled from a number of grids placed along the axes Y and X orthogonally arranged with each other and every plane grid has a different ki=di/ai. This protective system uses a plurality of square or rectangular shaped modules preferably arranged in rows as shown.

In certain embodiments, it is preferred to provide the protective structures, clusters, or quasi clusters in any of the previously noted configurations, i.e., a honeycomb configuration, a saw configuration, and/or a plane grid configuration. Preferably, the honeycomb configuration includes a plurality of hexagonal shaped modules. Preferably, the saw configuration includes a plurality of triangular shaped modules. And, preferably, the plane grid configuration includes a plurality of rectangular (including square) shaped modules. It will be understood that in no way is the invention limited to any of these particular shapes or configurations.

The extent of aerodynamic anisotropy created by such types of protective systems is so high that the systems are projected to destabilize and disintegrate practically all real tornadoes and specifically those of categories F0-F4 most often encountered in the United States. The arrangement of a number of such modules in a 3-D protective system provides effective influence on a wide array of different DVAS and ensures the destruction of the DVAS structure.

The various protective structures described herein are unique because they exhibit relatively low aerodynamic resistance and produce significant secondary fields of turbulence. In view of their relatively low aerodynamic resistance, the protective structures remain secured or otherwise constructed with the ground or other base even during exposure to high wind speeds associated with real tornadoes. Thus, conventional construction and assembly techniques can be used for mounting or attaching a protective system to the ground or to another suitable base. Upon exposure to a tornado or other atmospheric vortex structure, the protective structures produce secondary turbulent fields the extent of which increase nonlinearly with approaching proximity by the tornado. As previously explained, the protective structures are preferably configured to exhibit certain ranges of G parameters. Typically, in order to exhibit such G parameters, the average height of the protective structure is at least 4%, more preferably at least 6%, and most preferably at least 10% of the height of the atmospheric vortex structure.

In certain embodiments, the protective structures of the invention feature relatively high degrees of aerodynamic transparency. Thus, the protective structures exhibit low resistance to air flows passing through the protective structures. This feature enables the protective structures to remain viable and extended during exposure to DVAS and associated phenomena, e.g., high wind speeds. This is in sharp contrast to typical buildings, enclosures, and man-made structures such as signs, billboards, fences, and the like. This is also in sharp contrast to naturally occurring objects such as trees and bushes. Evidence of the significant aerodynamic resistance presented by typical man-made structures or naturally occurring objects that extend above ground, is the well known area of devastation that results from a tornado. In such areas, any object previously extending above the ground is either obliterated, removed, or otherwise rendered to lay along the ground.

The protective systems as described herein, can be formed from a wide array of materials. Preferably, the protective systems are formed from a weather-resistant and dimensionally stable material such as steel. However, other materials are contemplated such as composite building materials.

In one embodiment, the protective system is provided in the form of a selectively raisable structure. In a mode of non-use, the structure is configured to lay flat or be retracted in ground such that the structure is hidden from view, or substantially so. Preferably, when in a non-use mode, the protective system is hidden from view with respect to the object(s) to be protected. In a use mode, the structure is raised or otherwise positioned to extend upward from the ground. The initiation of positioning the structure in a use mode can be performed by manual actuation such as by activating an electric motor or hydraulic system to position and/or raise the protective structure as desired. Alternatively, the initiation of positioning of the protective structure can be performed automatically such as by use of one or more computer algorithms or other software. Sensors may be used to activate positioning of the protective system. Nonlimiting examples of such sensors include barometric pressure, atmospheric temperature, and atmospheric wind speed.

The present invention is not limited to the destruction, interruption, and/or destabilization of tornadoes. Instead, the methods, systems, and structures of the present invention can be used for cyclones, funnels, twisters, whirlwinds, and other similar meteorological phenomena. It is also contemplated that vortex structures associated with hurricanes, typhoons, tempests, monsoons, and similar phenomena, can be destabilized using aspects of the present invention.

Many other benefits will no doubt become apparent from future application and development of this technology.

All patents, published applications, and articles noted herein are hereby incorporated by reference in their entirety.

It will be understood that any one or more feature or component of one embodiment described herein can be combined with one or more other features or components of another embodiment. Thus, the present invention includes any and all combinations of components or features of the embodiments described herein.

As described hereinabove, the present invention solves many problems associated with previous type strategies and devices. However, it will be appreciated that various changes in the details, materials and arrangements of operations and components, which have been herein described and illustrated in order to explain the nature of the invention, may be made by those skilled in the art without departing from the principle and scope of the invention, as expressed in the appended claims.

What is claimed is:

1. A method for destabilizing a dynamic atmospheric vortex structure, the method comprising:
   providing a cluster of spatially oriented discrete mechanical elements at a location relative to the vortex structure to thereby produce an area of local active anisotropy, which creates a non-stationary, turbulent field with significant anisotropy that destabilizes the vortex structure, wherein the vortex structure is a tornado.

2. The method of claim 1 wherein the non-stationary turbulent field includes anisotropy of at least one of density, pressure, secondary flow velocity and turbulence parameters.

3. The method of claim 1 wherein the cluster comprises a plurality of elementary turbulent transformers.

4. The method of claim 3 wherein at least a majority of the elementary turbulent transformers are cylindrical in shape.

5. The method of claim 1 wherein the cluster is configured to exhibit a G parameter value in a range of about 0.0001 to about 10 m.

6. The method of claim 5 wherein the cluster is configured to exhibit a G parameter value in a range of about 0.001 to about 1 m.

7. The method of claim 6 wherein the cluster is configured to exhibit a G value of about 1 m.

8. The method of claim 1 wherein the height of the cluster of spatially oriented discrete mechanical elements is greater than about 4% of the height of the vortex structure.

9. The method of claim 8 wherein the height of the cluster is greater than about 6% of the height of the vortex structure.

10. The method of claim 9 wherein the height of the cluster is greater than about 10% of the height of the vortex structure.

11. The method of claim 1 wherein the cluster is in a honeycomb configuration including a plurality of hexagonal shaped modules.

12. The method of claim 1 wherein the cluster is in a saw configuration including a plurality of triangular shaped modules.

13. The method of claim 1 wherein the cluster is in a plane grid configuration including a plurality of rectangular modules.

* * * * *